US009977526B1

(12) United States Patent
Lee et al.

(10) Patent No.: US 9,977,526 B1
(45) Date of Patent: May 22, 2018

(54) DISPLAY DEVICE WITH HIGH TOUCH DETECTION SENSITIVITY

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW); Chia-Hsun Tu, New Taipei (TW)

(73) Assignee: SUPER-TOUCH CORPORATION, New Taipei (TW)

( * ) Notice: Subject to any disclaimer, the term of this patent is extended or adjusted under 35 U.S.C. 154(b) by 0 days. days.

(21) Appl. No.: 15/491,456

(22) Filed: Apr. 19, 2017

(51) Int. Cl.
| | |
|---|---|
| *G06F 3/041* | (2006.01) |
| *G06F 3/044* | (2006.01) |
| *G02F 1/1368* | (2006.01) |
| *G02F 1/1362* | (2006.01) |
| *G02F 1/1343* | (2006.01) |
| *G02F 1/1335* | (2006.01) |
| *G02F 1/1333* | (2006.01) |

(52) U.S. Cl.
CPC .......... *G06F 3/0412* (2013.01); *G02F 1/1368* (2013.01); *G02F 1/13338* (2013.01); *G02F 1/13439* (2013.01); *G02F 1/133345* (2013.01); *G02F 1/133512* (2013.01); *G02F 1/133514* (2013.01); *G02F 1/136286* (2013.01); *G06F 3/044* (2013.01); *G06F 3/0416* (2013.01); *G02F 1/133528* (2013.01); *G02F 2201/121* (2013.01); *G02F 2201/123* (2013.01); *G02F 2201/50* (2013.01); *G06F 2203/04112* (2013.01)

(58) Field of Classification Search
CPC ....................................................... G06F 3/041
See application file for complete search history.

(56) References Cited

U.S. PATENT DOCUMENTS

| 9,285,902 B1* | 3/2016 | Kremin .................. G06F 3/044 |
| 2008/0309625 A1* | 12/2008 | Krah ...................... G06F 3/041 345/173 |
| 2015/0035797 A1* | 2/2015 | Shahparnia ............ G06F 3/041 345/174 |

* cited by examiner

*Primary Examiner* — Sanghyuk Park
(74) *Attorney, Agent, or Firm* — Muncy, Geissler, Olds & Lowe, P.C.

(57) ABSTRACT

A display device includes a TFT substrate layer, a display material layer, a common electrode layer, a touch electrode layer, a display control circuit and a touch control circuit. The common electrode layer has a common electrode. The touch electrode layer includes plural first touch electrodes and plural second touch electrodes. The display control circuit includes a display power. The touch control circuit includes a touch power independent to the display power. The touch control circuit sequentially or randomly couples a touch stimulation signal to a selected first touch electrode or receives a touch sense signal from a selected second touch electrode. The touch sense signal is driven and coupled to the common electrode layer or a node of the display control circuit for performing a touch detection operation in which there is no current loop between the display control circuit and the touch control circuit.

22 Claims, 27 Drawing Sheets

DISPLAY DEVICE WITH HIGH TOUCH DETECTION SENSITIVITY

BACKGROUND OF THE INVENTION

1. Field of the Invention

The present invention relates to a touch display panel and, more particularly, to a display device with high touch detection sensitivity.

2. Description of Related Art

Mutual capacitive touch technology is widely used in flat panel display devices for it's less wiring, low cost, and multi-touch feature. Due to the trend of requiring lighter ˎ thinner touch display panels, the In-cell touch panel is inevitable. But, when the touch electrodes are placed in the display panel structure, it encounters the great challenge of the huge stray capacitance between the touch electrodes and the common electrode.

Typically solution is cutting the common electrode into many pieces of electrodes and applying the time sharing technology. In other words, the common electrodes are also touch electrodes. While avoiding the above problems, it hinders the improvement of display resolution, reduces display quality and increases production difficulty, resulting in a significant increase in cost FIG. 1 is a schematic diagram of a touch display panel. The touch display panel 100 includes a touch module 110 and a display module 120, and it is provided with a mutual-capacitance sense technology. In the touch detection operation, a touch stimulation circuit 111 outputs a touch stimulation signal to a touch transmit electrode 112, and a touch sense circuit 114 receives a touch sense signal Vrx from a touch receive electrode 113.

As shown in FIG. 1, there are parasitic capacitances, denoted as Ctr, Crc and Ctc, among the touch transmit electrode 112, the touch receive electrode 113 and the common electrode 122, where Ctr represents the parasitic capacitance between the touch transmit electrode 112 and the touch receive electrode 113, Crc represents the parasitic capacitance between the touch receive electrode 113 and the common electrode 122, and Ctc represents the parasitic capacitance between the touch transmit electrode 112 and the common electrode 122. Due to the common electrode is very close the touch transmit electrode 112 and touch receive electrode 113, and the size of the common electrode 122 being much larger than the size of the touch transmit electrode 112 and touch receive electrode 113, the magnitude of Crc or Ctc is much larger than that of Ctr.

FIG. 2 is a schematic diagram illustrating the equivalent capacitance of FIG. 1. In FIG. 2, it illustrates the equivalent parasitic capacitance among the touch transmit electrode 112, the touch receive electrode 113, and the common electrode 122. Due to the common electrode 122 being regarded as a conductive line, the parasitic capacitances Crc and Ctc are connected in series. The parasitic capacitance Crct is equal to the Crc in series with the Ctc. Between the touch transmit electrode 112 and the touch receive electrode 113, the parasitic capacitances Ctr and Crct are connected in parallel and the Crct is much larger than Ctr. Thus, the equivalent capacitance between the touch transmit electrode 112 and the touch receive electrode 113 is approximate to Crct (=Crct+Ctr≈Crct).

FIG. 3 is a schematic diagram illustrating a finger touching the touch display panel of FIG. 1. As shown, when a finger touches or approaches the touch transmit electrode 112 and the touch receive electrode 113, the finger may absorb a portion of electric flux lines thereby reducing the parasitic capacitance between the touch transmit electrode 112 and the touch receive electrode 113. That is, when a finger touches or approaches the touch transmit electrode 112 and the touch receive electrode 113, the corresponding parasitic capacitance Ctr1 is less than parasitic capacitance Ctr. According to the description of the equivalent capacitance in FIG. 2, when a finger touches or approaches the touch transmit electrode 112 and the touch receive electrode 113, the equivalent capacitance between the touch transmit electrode 112 and the touch receive electrode 113 is also approximate to Crct. As a result, the touch display panel 100 cannot detect the touch of a finger owing to the large parasitic capacitances of Crc and Ctc. That is, the background parasitic capacitances of Crc and Ctc are too large to perform touch detection on the touch display panel 100.

Therefore, it is desirable to provide an improved touch panel device to mitigate and/or obviate the afore-mentioned problems.

SUMMARY OF THE INVENTION

The object of the present invention is to provide a display device with high touch detection sensitivity capable of greatly reducing the background parasitic capacitances and significantly increasing the touch detection accuracy, so as to be more suitable for the trend of touch detection in comparison with the prior art.

In one aspect of the disclosure, there is provided a display device with high touch detection sensitivity. The display device with high touch detection sensitivity comprises a thin film transistor (TFT) substrate layer, a display material layer, a common electrode layer, a touch electrode layer, a display control circuit, and a touch control circuit. The TFT substrate layer includes a first substrate having a surface formed thereon a plurality of display TFTs, a plurality of gate lines and data lines, and a pixel electrode layer having a plurality of display pixel electrodes. The display material layer is composed of liquid crystal and disposed on one side of the TFT substrate. The common electrode layer is disposed on one side of the first substrate, on the same side as the TFTs. The touch electrode layer is disposed on one side of the display material layer opposite to the TFT substrate. The touch electrode layer includes a plurality of first touch electrodes and a plurality of second touch electrodes. The plurality of first touch electrodes are arranged along a first direction and the plurality of second touch electrodes are arranged along a second direction. The display control circuit includes a display power and a display drive circuit. The touch control circuit includes a touch power and a mutual-capacitance sense circuit. The touch control circuit sequentially or randomly couples a touch stimulation signal to a selected first touch electrode and receives a touch sense signal from a selected second touch electrode. The touch sense signal is driven by an in-phase amplifier and coupled to the common electrode layer or a node of the display control circuit for performing a touch detection operation. In the touch detection operation, there is no current loop between the display control circuit and the touch control circuit, or there is a high impedance between the display control circuit and the touch control circuit and the high impedance is not less than 100 KΩ (Ohm).

In another aspect of the disclosure, there is provided a display device with high touch detection sensitivity. The display device with high touch detection sensitivity comprises a thin film transistor (TFT) substrate layer, a color filter substrate layer, a display material layer, a display control circuit, and a touch control circuit. The TFT substrate layer includes a substrate, a TFT layer, a common electrode layer, a display electrode and first touch electrode layer, and a second electrode layer. The TFT layer is disposed on one side of the substrate, and includes a plurality of display TFTs, a plurality of gate lines, and a plurality of data lines. The common electrode layer is disposed on one side of the TFT layer opposite to the substrate, and includes a common voltage electrode. The display electrode and first touch electrode layer is disposed on one side of the common electrode layer opposite to the substrate, and includes a plurality of display pixel electrodes and a plurality of first transparent mesh electrodes arranged along a first direction. The second electrode layer is disposed on one side of the display electrode and first touch electrode layer opposite to the common electrode layer, and includes a plurality of second touch electrodes arranged along a second direction. The color filter substrate layer includes a substrate layer, a black matrix layer, and a color filter layer. The display material layer is disposed between the TFT substrate layer and the color filter substrate layer. The display control circuit includes a display power and a display drive circuit. The touch control circuit includes a touch power and a mutual-capacitance sense circuit. The touch control circuit sequentially or randomly couples a touch stimulation signal to a selected first transparent mesh electrode and receiving a touch sense signal from a selected second touch electrode. The touch sense signal is driven by an in-phase amplifier and coupled to the common electrode layer or a node of the display control circuit for performing a touch detection operation. In the touch detection operation, there is no current loop between the display control circuit and the touch control circuit, or there is a high impedance between the display control circuit and the touch control circuit and the high impedance is not less than 100 KΩ (Ohm).

Other objects, advantages, and novel features of the invention will become more apparent from the following detailed description when taken in conjunction with the accompanying drawings.

DETAILED DESCRIPTION OF THE PREFERRED EMBODIMENT

Figure 4A:
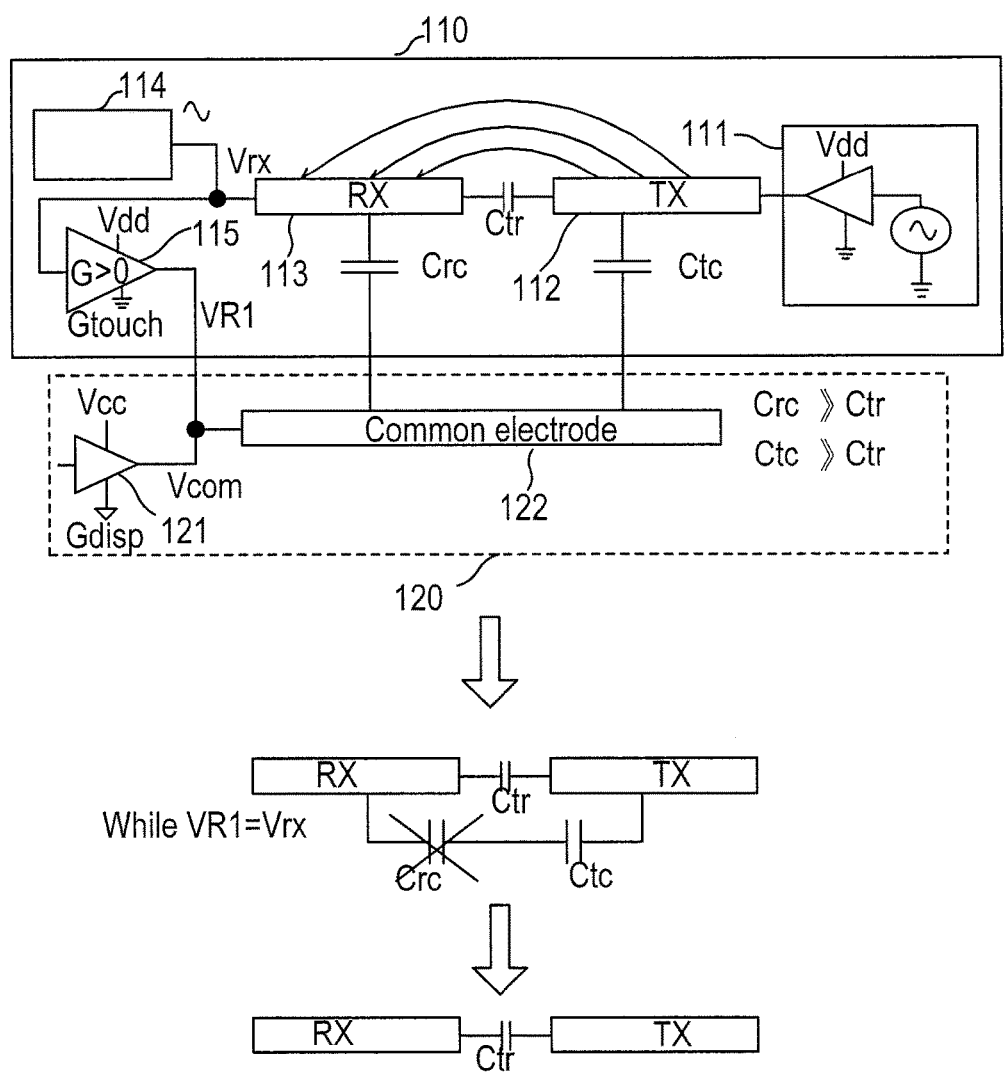
FIG. 4A is a schematic diagram illustrating the operation theory of the display device with high touch detection sensitivity in accordance with the present disclosure.

With reference to FIG. 4A, there is shown a schematic diagram illustrating the operation theory of the display device with high touch detection sensitivity in accordance with the present disclosure. In the present disclosure, it uses an in-phase amplifier 115 to amplify the touch sense signal Vrx so as to generate a driven touch sense signal VR1 and couple the driven touch sense signal VR1 to the common electrode 122. Because the in-phase amplifier 115 is powered by a power system (Vdd and Gtouch) which is independent and different from the power system (Vcc and Gdisp) of the display module 120, the driven touch sense signal VR1 does not influence the common voltage Vcom on the common electrode 122. Thus, the display operation will not be interfered by the driven touch sense signal VR1.

While voltage Vrx on the touch receive electrode 113 is the same as the voltage VR1 on the common electrode 122, the touch receive electrode 113 and the common electrode 122 are in the same voltage level and thus there is no electric field between the touch receive electrode 113 and the common electrode 122. Therefore, the parasitic capacitance Crc between the touch receive electrode 113 and the common electrode 122 will be disappeared and the parasitic capacitance Ctc between the touch transmit electrode 112 and the common electrode 122 is in a floating state. The background parasitic capacitances of Crc and Ctc are removed. There is only the parasitic capacitance Ctr existed between the touch transmit electrode 112 and the touch receive electrode 113. As a result, the display device with high touch detection sensitivity is able to actually and accurately perform the touch detection with high touch detection sensitivity.

Figure 4B:
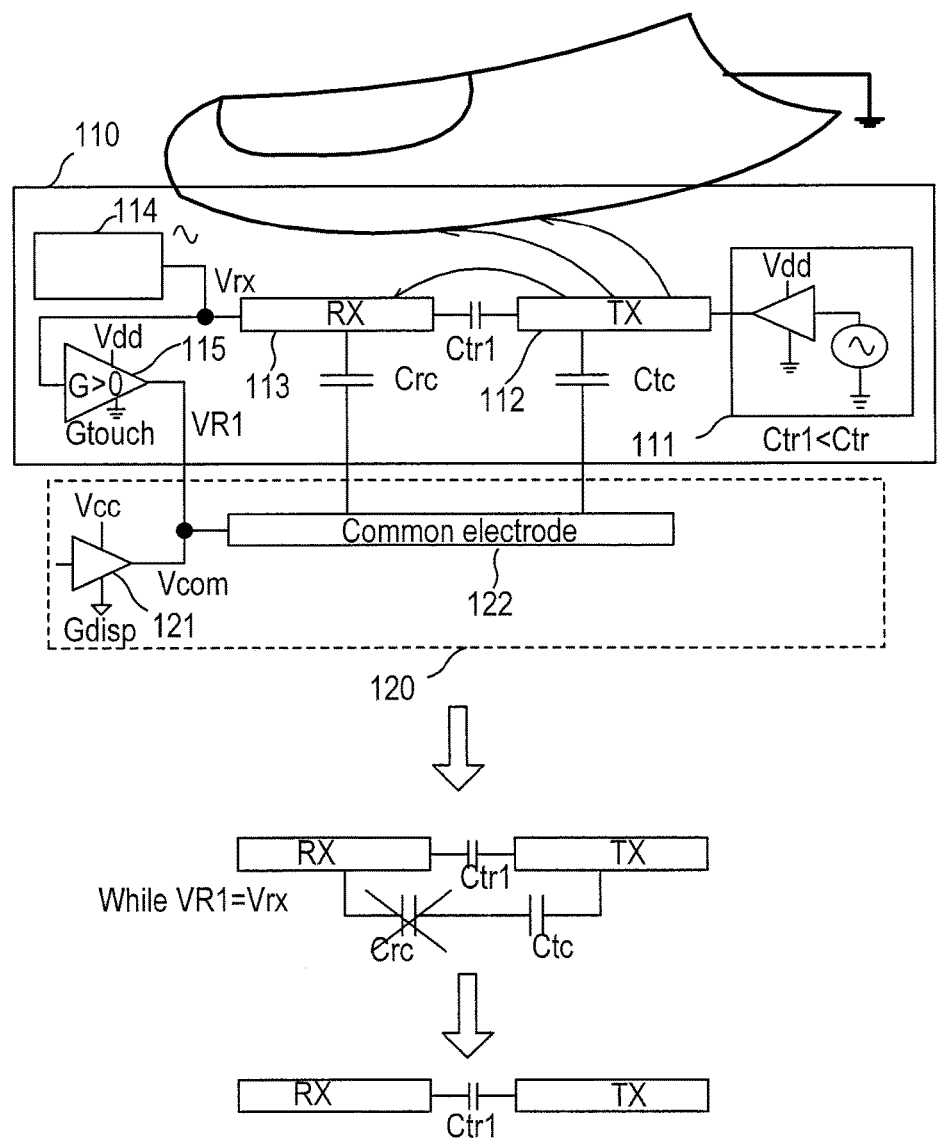
FIG. 4B is a schematic diagram illustrating a finger touching the display device with high touch detection sensitivity in accordance with the present disclosure.

FIG. 4B is a schematic diagram illustrating a finger touching the display device with high touch detection sensitivity in accordance with the present disclosure. As shown, owing to the background parasitic capacitances of Crc and Ctc being removed, the equivalent capacitance is changed from Ctr to Ctr1 as a finger touches or approaches the display device, and thus it can perform the touch detection with high touch detection sensitivity.

Figure 5A:
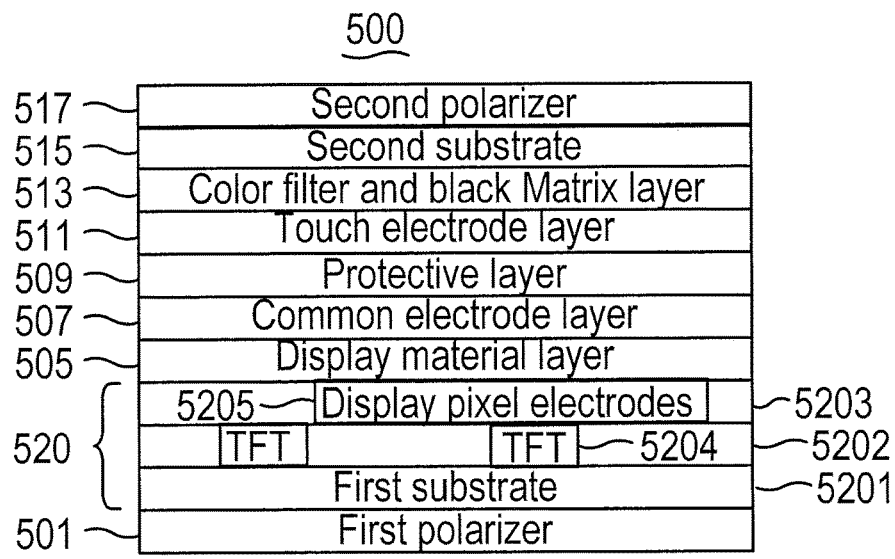
FIG. 5A is a first exemplary stack-up diagram of the display device with high touch detection sensitivity in accordance with the present disclosure.

FIG. 5A is a first exemplary stack-up diagram of the display device with high touch detection sensitivity in accordance with the present disclosure. As shown, the display device 500 includes a first polarizer 501, a thin film transistor (TFT) substrate layer 520, a display material layer 505, a common electrode layer 507, a protective layer 509, a touch electrode layer 511, a color filter and black matrix layer 513, a second substrate 515, and a second polarizer 517.

Figure 12A:
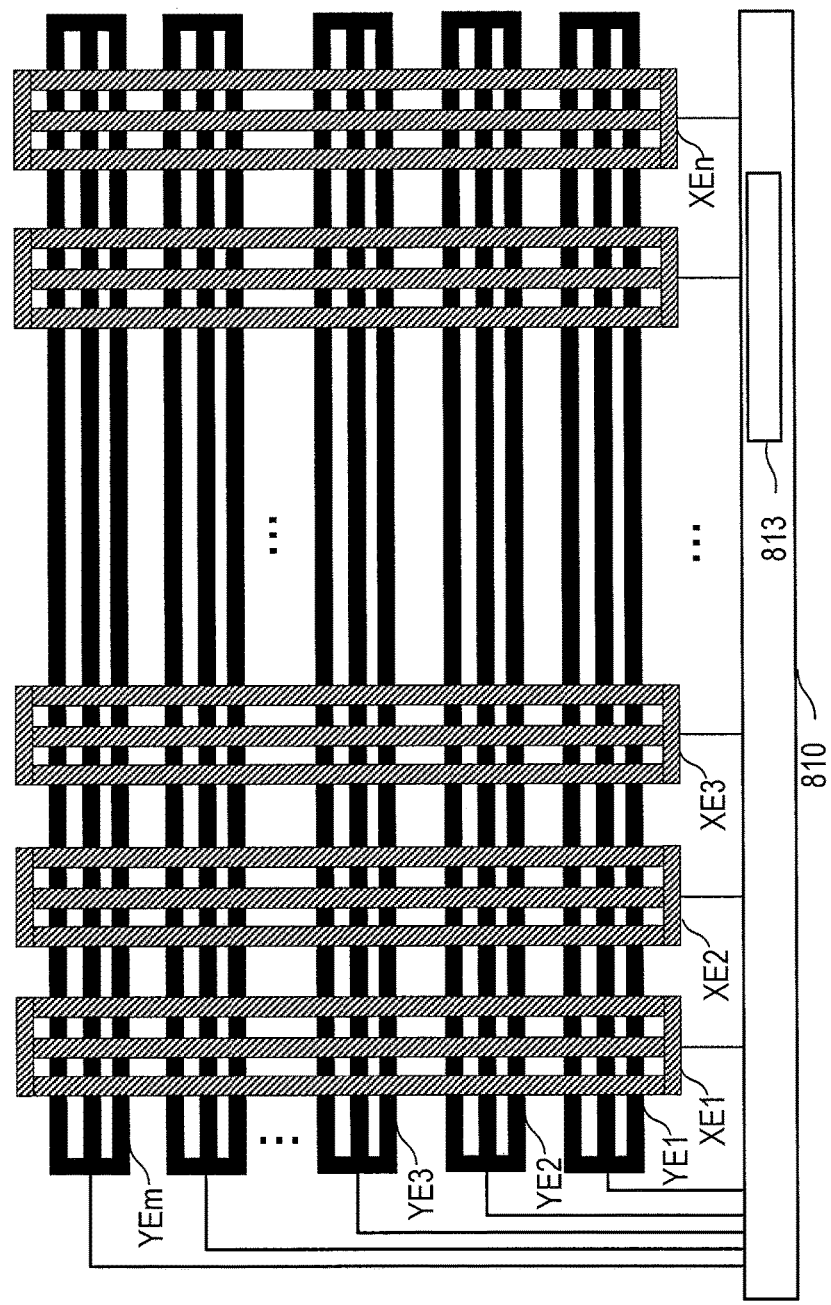
FIG. 12A is still another schematic diagram of the touch electrode layer and the touch control circuit in accordance with the present disclosure.
Figure 12B:
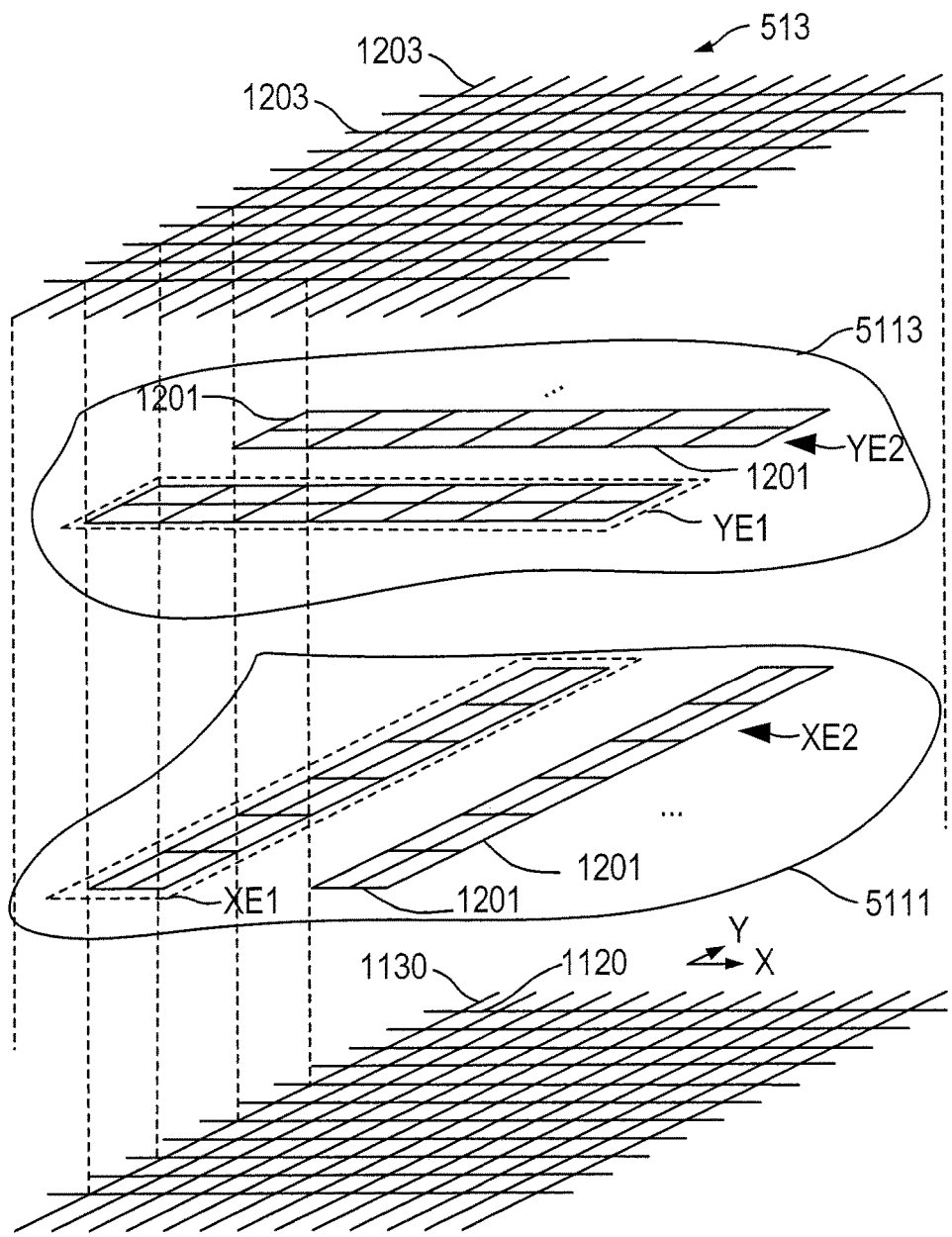
FIG. 12B is a schematic diagram illustrating the relation of the black matrix layer, the touch electrode layer, and the data lines and gate lines of the display device shown in FIG. 12A.

The TFT substrate layer 520 includes a first substrate 5201 having a surface formed thereon a plurality of gate lines and data lines (in which the gate lines and data lines are well known to those skilled in the field of display devices and are only shown in FIG. 12B with numerals 1120 and 1130), a thin film transistor (TFT) layer 5202 having a plurality of display TFTs 5204, and a pixel electrode layer 5203 having a plurality of display pixel electrodes 5205.

The display material layer 505 is disposed on one side of the TFT substrate layer 520.

The common electrode layer 507 is disposed on one side of the display material layer 505 opposite to the TFT layer 5202.

The protective layer 509 is disposed on one side of the common electrode layer 507.

Figure 10:
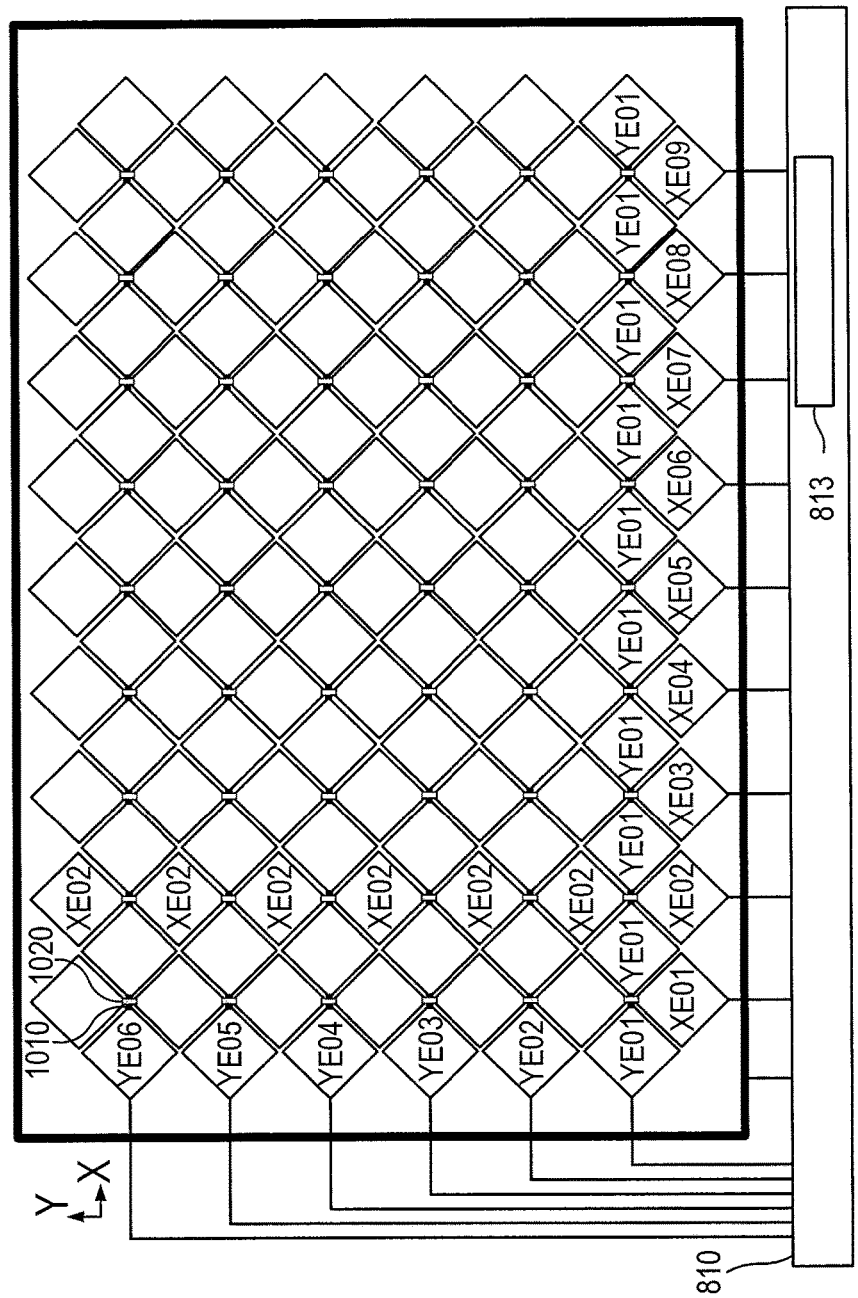
FIG. 10 is a schematic diagram of the touch electrode layer and the touch control circuit in accordance with the present disclosure.

The touch electrode layer 511 is disposed on one side of the display material layer 505 opposite to the TFT substrate layer 520. The touch electrode layer 511 includes a plurality of first touch electrodes (as shown in FIG. 10 with numerals XE01, XE02 . . . , or in FIG. 11 with numerals XE1-XEn) arranged along a first direction (X-axis direction) and a plurality of second touch electrodes (as shown in FIG. 10 with numerals YE01, YE01 . . . , or in FIG. 11 with numerals YE1-YEm) arranged along a second direction (Y-axis direction).

The color filter and black matrix layer 513 is disposed on one side of the touch electrode layer 511 opposite to the TFT substrate layer 520. The second substrate 515 is disposed on one side of the color filter and black matrix layer 513 opposite to the TFT substrate layer 520. The second polarizer 517 is disposed on one side of the second substrate 515 opposite to the TFT substrate layer 520.

Figure 5B:
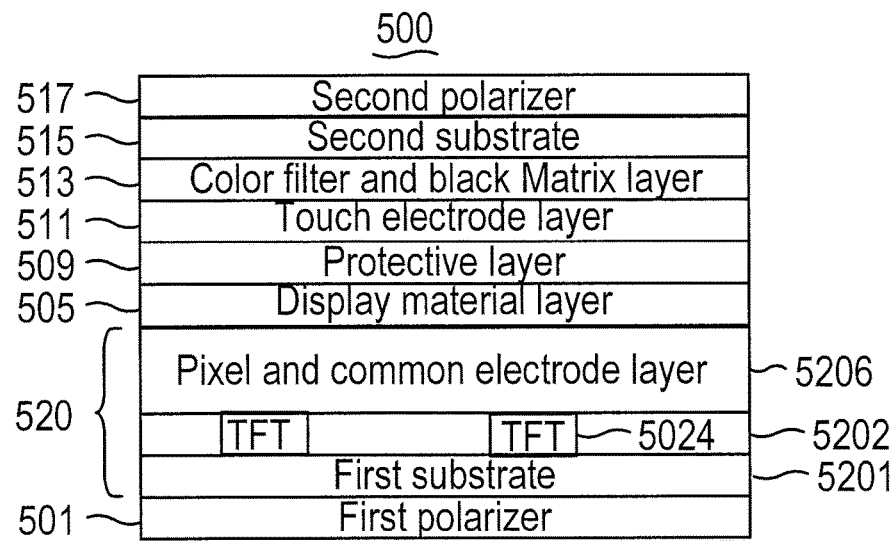
FIG. 5B is a second exemplary stack-up diagram of the display device with high touch detection sensitivity in accordance with the present disclosure.

FIG. 5B is a second exemplary stack-up diagram of the display device with high touch detection sensitivity in accordance with the present disclosure. The display device 500 of FIG. 5B is similar to that of FIG. 5A except that: in FIG. 5A, the common electrode layer 507 and the pixel electrode layer 5203 are two separated layers while, in FIG. 5B, the common electrode layer is disposed in the pixel electrode layer to form a pixel and common electrode layer 5206.

Figure 5C:
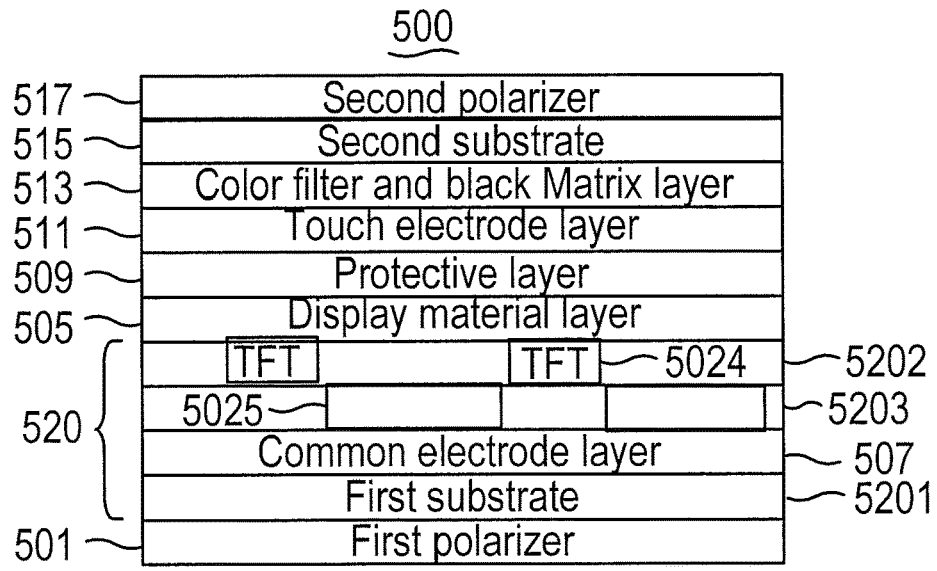
FIG. 5C is a third exemplary stack-up diagram of the display device with high touch detection sensitivity in accordance with the present disclosure.

FIG. 5C is a third exemplary stack-up diagram of the display device with high touch detection sensitivity in accordance with the present disclosure. The display device 500 of FIG. 5C is similar to that of FIG. 5A except that: in FIG. 5A, the common electrode layer 507 is disposed between the display material layer 505 and the protective layer 509 while, in FIG. 5C, the common electrode layer 507 is disposed beneath the pixel electrode layer 5203.

Figure 6A:
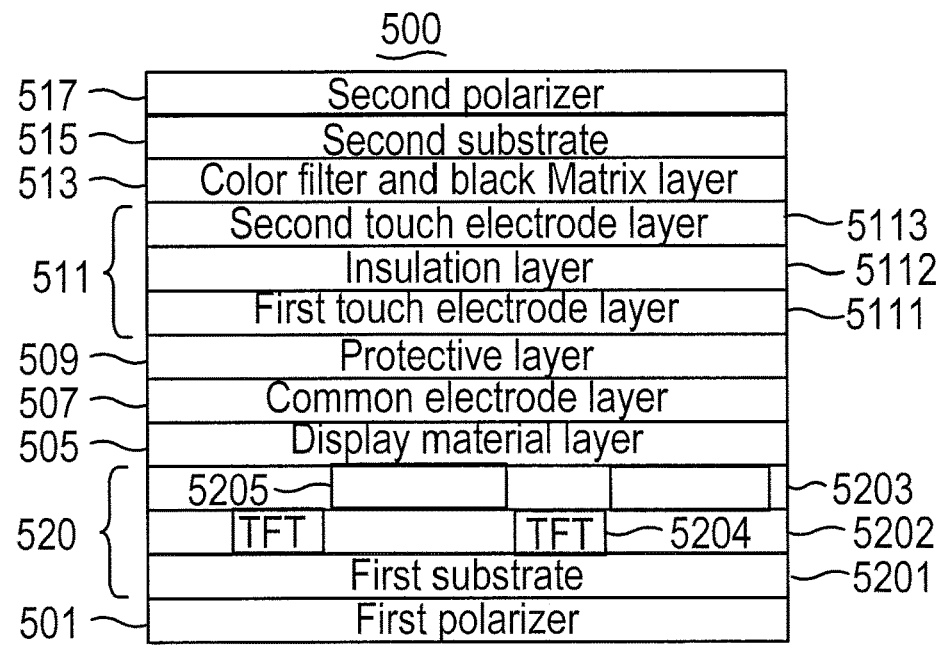
FIG. 6A is a fourth exemplary stack-up diagram of the display device with high touch detection sensitivity in accordance with the present disclosure.

FIG. 6A is a fourth exemplary stack-up diagram of the display device with high touch detection sensitivity in accordance with the present disclosure. The display device 500 of FIG. 6A is similar to that of FIG. 5A except that: in FIG. 5A, the touch electrode layer 511 is a single touch electrode layer while, in FIG. 6A, the touch electrode layer 511 includes a first touch electrode layer 5111, an insulation layer 5112 and a second touch electrode layer 5113.

Figure 6B:
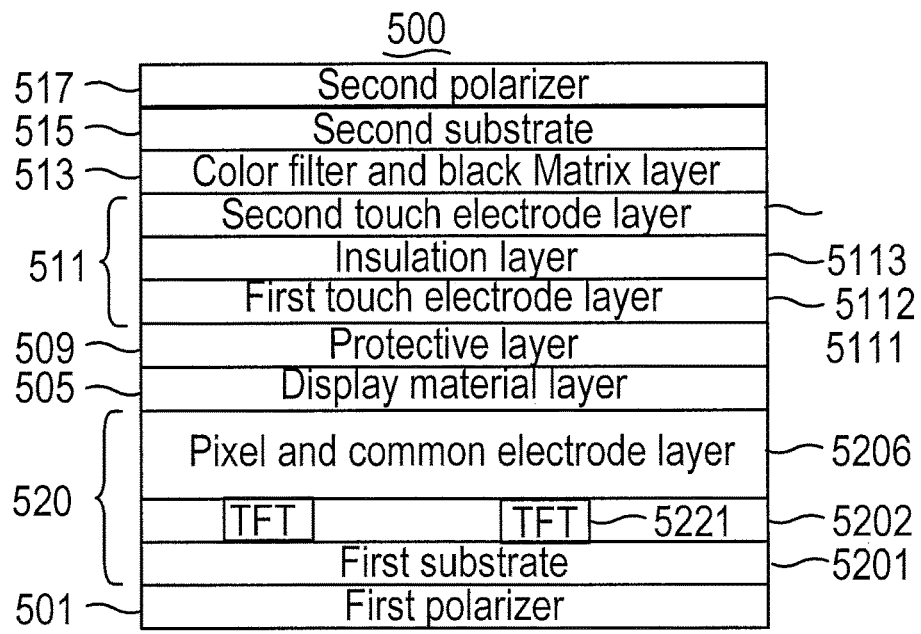
FIG. 6B is a fifth exemplary stack-up diagram of the display device with high touch detection sensitivity in accordance with the present disclosure.

FIG. 6B is a fifth exemplary stack-up diagram of the display device with high touch detection sensitivity in accordance with the present disclosure. The display device 500 of FIG. 6B is similar to that of FIG. 6A except that: in FIG. 6A, the common electrode layer 507 and the pixel electrode layer 5203 are two separated layers while, in FIG. 6B, the common electrode layer is disposed in the pixel electrode layer to form a pixel and common electrode layer 5206.

Figure 6C:
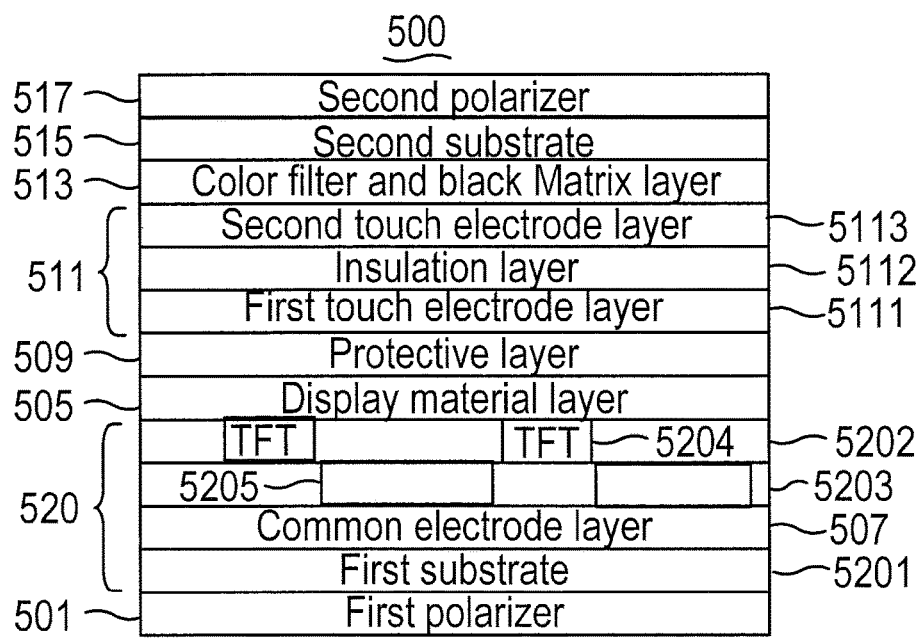
FIG. 6C is a sixth exemplary stack-up diagram of the display device with high touch detection sensitivity in accordance with the present disclosure.

FIG. 6C is a sixth exemplary stack-up diagram of the display device with high touch detection sensitivity in accordance with the present disclosure. The display device 500 of FIG. 6C is similar to that of FIG. 6A except that: in FIG. 6A, the common electrode layer 507 is disposed between the display material layer 505 and the protective layer 509 while, in FIG. 6C, the common electrode layer 507 is disposed beneath the pixel electrode layer 5203.

Figure 7A:
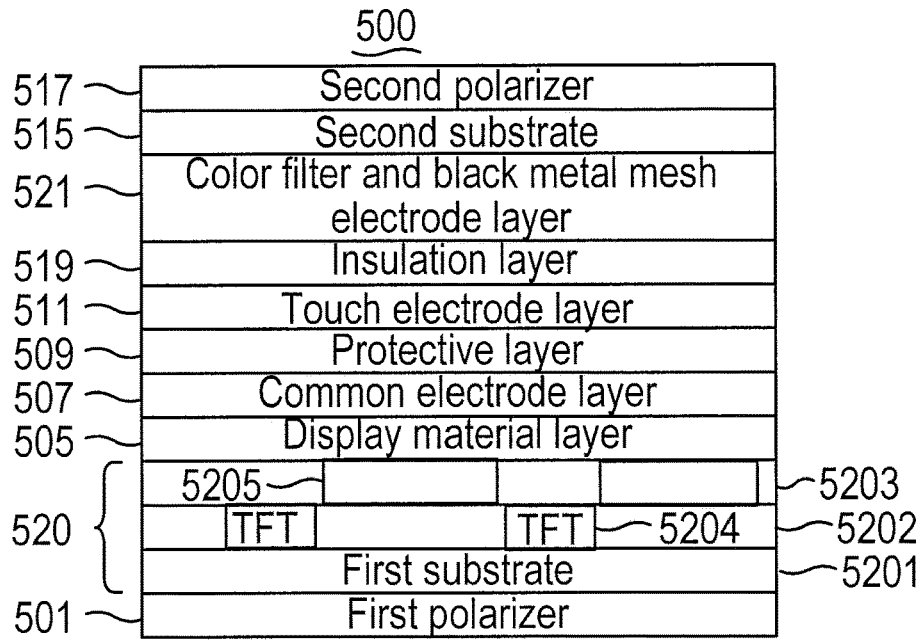
FIG. 7A is a seventh exemplary stack-up diagram of the display device with high touch detection sensitivity in accordance with the present disclosure.

FIG. 7A is a seventh exemplary stack-up diagram of the display device with high touch detection sensitivity in accordance with the present disclosure. The display device 500 of FIG. 7A is similar to that of FIG. 5A except that: in FIG. 5A, the color filter and black matrix layer 513 is only used to avoid R, G, B color film mixing for reducing the influence of the light from the adjacent sub-pixels while, in FIG. 7A, the color filter and black matrix layer is replaced by a color filter and black metal mesh electrode layer 521, and an insulation layer 519 disposed between the color filter and black metal mesh electrode layer 521 and the touch electrode layer 511. The color filter and black metal mesh electrode layer 521 includes a plurality of black metal mesh electrodes. Each of the black metal mesh electrodes of the color filter and black metal mesh electrode layer 521 is formed by black metal mesh lines. One function of the black metal mesh lines of the black metal mesh electrodes is the same as that of the opaque lines of the color filter and black matrix layer 513 for avoiding R, G, B color film mixing to reduce the influence of the light caused by the adjacent sub-pixels. The other function of the black metal mesh lines is to sense the touch detection.

Figure 7B:
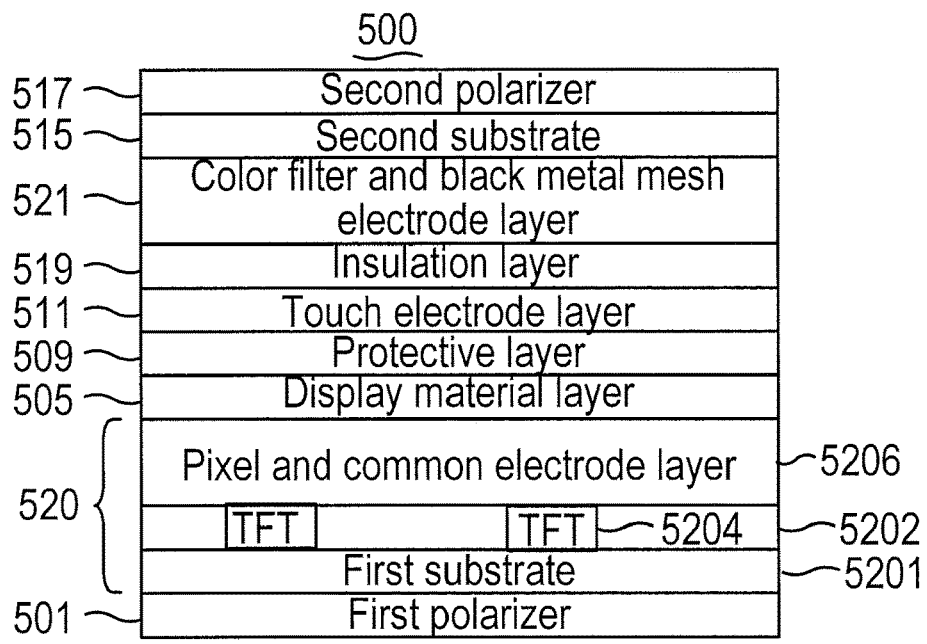
FIG. 7B is an eighth exemplary stack-up diagram of the display device with high touch detection sensitivity in accordance with the present disclosure.

FIG. 7B is an eighth exemplary stack-up diagram of the display device with high touch detection sensitivity in accordance with the present disclosure. The display device 500 of FIG. 7B is similar to that of FIG. 7A except that: in FIG. 7A, the common electrode layer 507 and the pixel electrode layer 5203 are two separated layers while, in FIG. 7B, the common electrode layer is disposed in the pixel electrode layer to form a pixel and common electrode layer 5206.

Figure 7C:
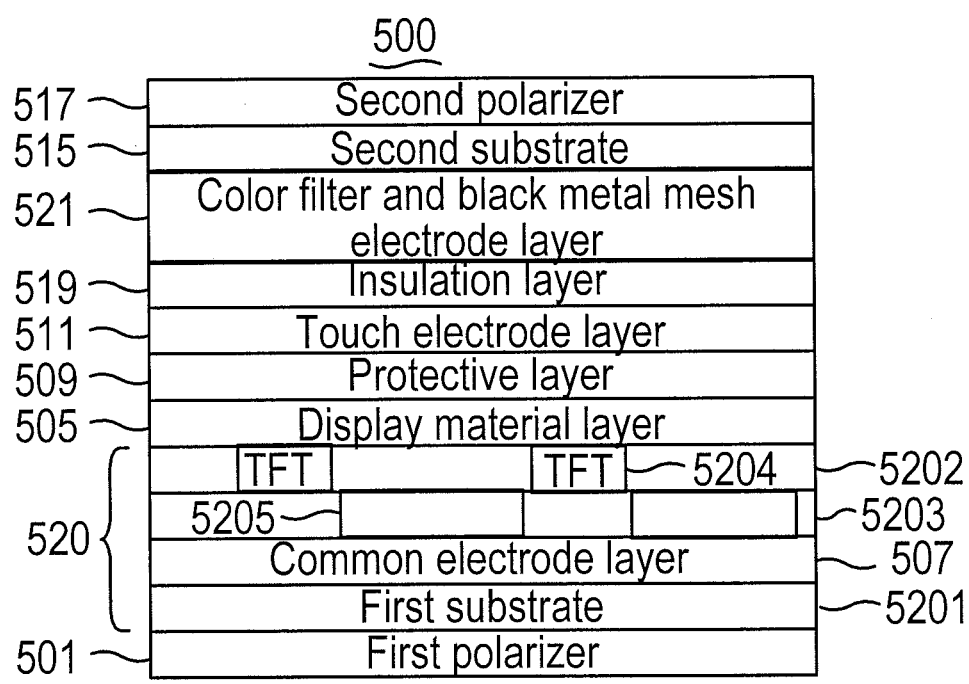
FIG. 7C is a ninth exemplary stack-up diagram of the display device with high touch detection sensitivity in accordance with the present disclosure.

FIG. 7C is a ninth exemplary stack-up diagram of the display device with high touch detection sensitivity in accordance with the present disclosure. The display device 500 of FIG. 7C is similar to FIG. 7A except that: in FIG. 7A, the common electrode layer 507 is disposed between the display material layer 505 and the protective layer 509 while, in FIG. 7C, the common electrode layer 507 is disposed beneath the pixel electrode layer 5203.

In FIG. 7A, FIG. 7B and FIG. 7C, each of the touch electrodes of the touch electrode layer 511 can be a metal mesh electrode or a transparent electrode.

Figure 8A:
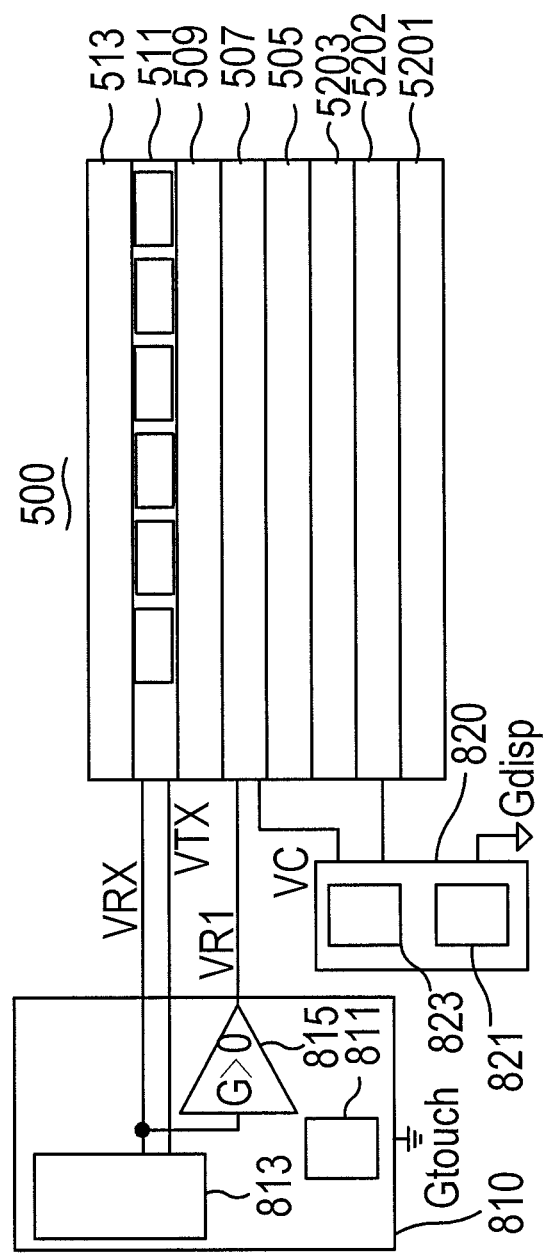
FIG. 8A is a schematic diagram of the display device with high touch detection sensitivity in accordance with the present disclosure

FIG. 8A is a schematic diagram of the display device with high touch detection sensitivity in accordance with the present disclosure. As shown, the display device 500 further includes a display control circuit 820 and a touch control circuit 810. The display control circuit 820 includes a display power 821 and a display drive circuit 823.

The display drive circuit 823 of the display control circuit 820 sequentially outputs a scan signal to a gate line, outputs data signals to the corresponding data lines, and outputs a common voltage signal VC to the common electrode layer 507 for performing a display operation.

The touch control circuit 810 includes a touch power 811, a mutual-capacitance circuit 813 and an in-phase amplifier 815. The in-phase amplifier has a gain greater than 0. The mutual-capacitance circuit 813 sequentially or randomly couples a touch stimulation signal VTX to a selected first touch electrode in the touch electrode layer 511 or receives a touch sense signal VRX from a selected second touch electrode of the touch electrode layer 511. The touch sense signal VRX is driven by the in-phase amplifier 815 and coupled to the common electrode layer 507. In the touch detection operation, there is no current loop between the display control circuit 820 and the touch control circuit 810, or there is a high impedance between the display control circuit 820 and the touch control circuit 810 and the high impedance is not less than 100 KΩ (Ohm).

The touch sense signal VRX is driven by the in-phase amplifier 815 to generate a signal VR1. The touch control circuit 810 couples the signal VR1 to the common electrode layer 507. According to the description in FIG. 4A and FIG. 4B of the present disclosure, the parasitic capacitance between the common electrode layer 507 and the first touch electrode and the second touch electrode in the touch electrode layer 511 will be zero, which can increase the accuracy of touch detection.

Because the signal VR1 comes from the touch control circuit 810 which is powered by the independent touch power 811 other than the display power 821 of the display control circuit 820. Therefore, the signal VR1 will not influence the common voltage signal VC, and the display quality will not be affected by the touch operation. On the other hand, the common voltage signal VC will not influence the signal VR1, and thus the accuracy of touch detection will not be affected by the display operation.

In the present disclosure, the touch control circuit 810 couples the signal VR1 to the common electrode layer 507, which means that the touch control circuit 810 directly outputs the signal VR1 to the common electrode layer 507, or the touch control circuit 810 outputs the signal VR1 through a passive component to the common electrode layer 507, wherein the passive component can be a resistor, a capacitor or a inductor.

The touch control circuit 810 can couple the signal VR1 to the other non-selected first touch electrodes or the other non-selected second touch electrodes, and the signal VR1 can be in phase with the touch sense signal VRX to further reduce the parasitic capacitance between the selected second touch electrode and the other non-selected first touch electrodes, or the parasitic capacitance between the selected second touch electrode and the other non-selected second touch electrodes.

Figure 8B:
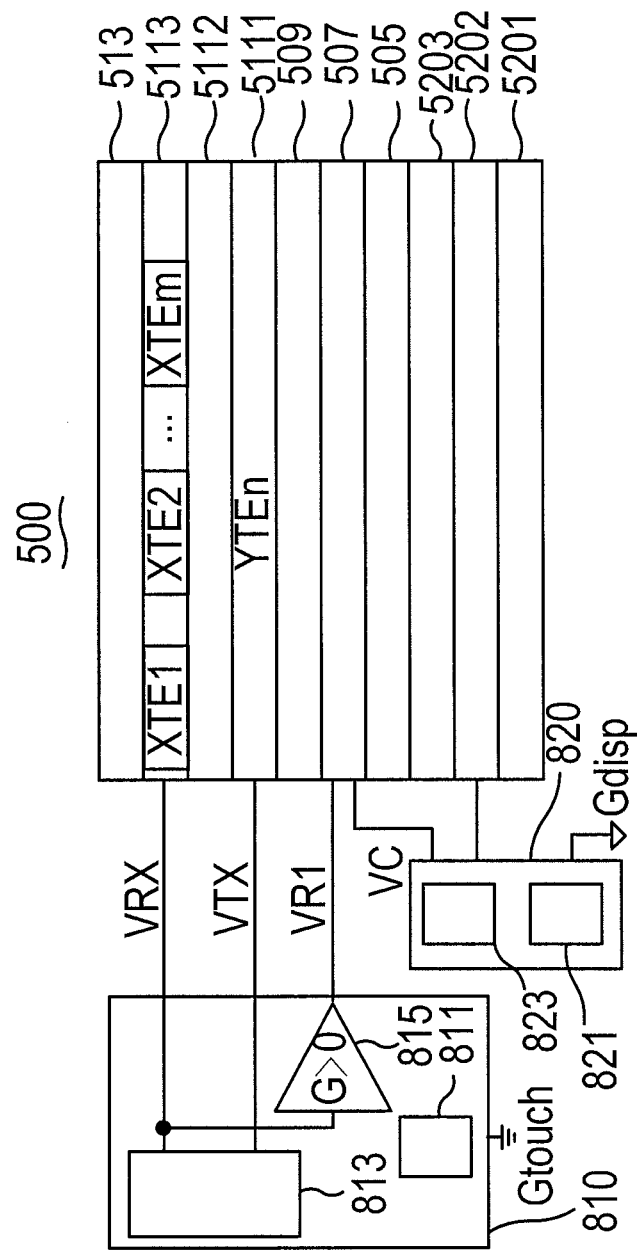
FIG. 8B is another schematic diagram of the display device with high touch detection sensitivity in accordance with the present disclosure.

FIG. 8B is another schematic diagram of the display device with high touch detection sensitivity in accordance with the present disclosure, which is similar to FIG. 8A except that: in FIG. 8A, the touch electrode layer 511 is a single touch electrode layer while, in FIG. 8B, the touch electrode layer 511 includes a first touch electrode layer 5111, an insulation layer 5112 and a second touch electrode layer 5113.

The mutual-capacitance circuit 813 sequentially or randomly couples a touch stimulation signal VTX to a selected first touch electrode YTEn in the first touch electrode layer 5111, receives a touch sense signal VRX from a selected second touch electrode XTEm of the second touch electrode layer 5113. The touch sense signal VRX is driven by the in-phase amplifier 815 and coupled to the common electrode layer 507.

Figure 8C:
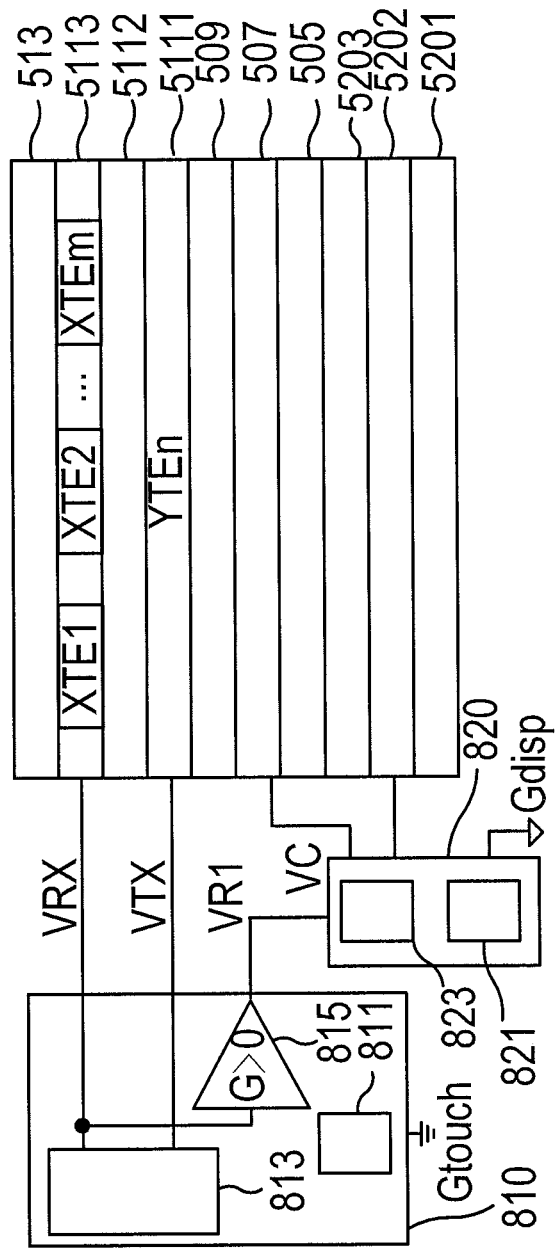
FIG. 8C is still another schematic diagram of the display device with high touch detection sensitivity in accordance with the present disclosure.

FIG. 8C is still another schematic diagram of the display device with high touch detection sensitivity in accordance with the present disclosure, which is similar to FIG. 8B except that: in FIG. 8B, the touch control circuit 810 couples the signal VR1 to the common electrode layer 507 while, in FIG. 8C, the touch control circuit 810 couples the signal VR1 to a node of the display control circuit 820 for performing a touch detection operation, wherein the node of the display control circuit 820 is a power output node of the display control circuit 820, a ground node of the display control circuit 820, or a drive output node of the display control circuit 820.

Figure 9:
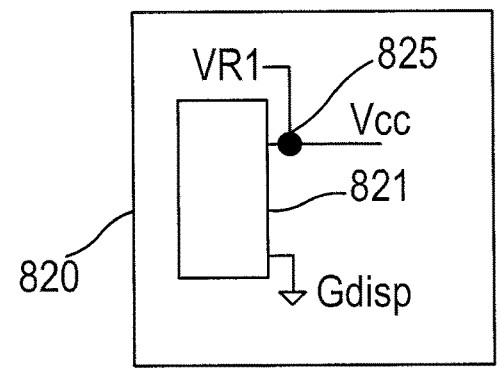
FIG. 9 is a schematic diagram of the signal VR1 and the node of the display control circuit in accordance of the present disclosure.
Figure 9:
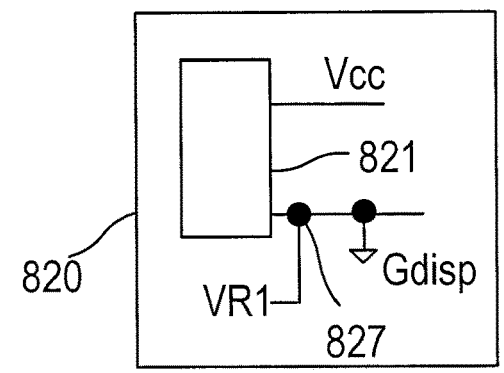
Figure 9:
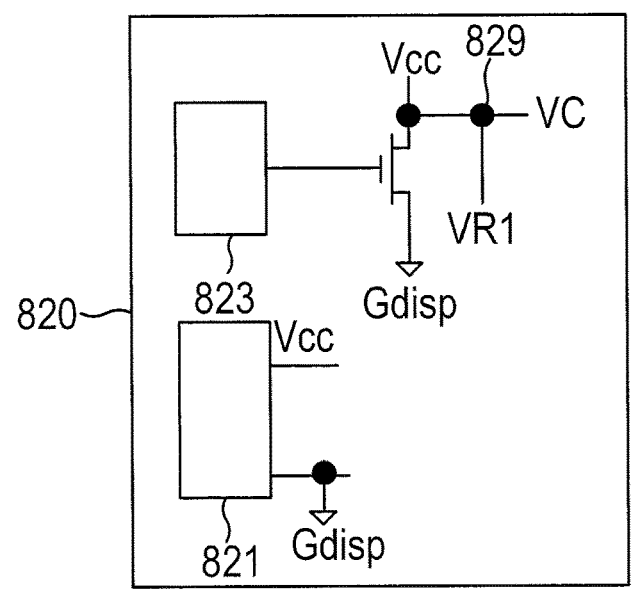

FIG. 9 is a schematic diagram of the signal VR1 and the node of the display control circuit in accordance of the present disclosure. As shown, the signal VR1 can be coupled to the power output node 825 of the display control circuit 820, the ground node 827 of the display control circuit 820, or the drive output node 829 of the display control circuit 820.

FIG. 10 is a schematic diagram of the touch electrode layer and the touch control circuit in accordance with the present disclosure. As shown, the touch electrode layer 511 is a single layer and includes a plurality of the first touch electrodes XE01, XE02, . . . , XE09 arranged along a first direction (X-axis direction) and a plurality of the second touch electrodes YE01, YE02, . . . , YE06 arranged along a second direction (Y-axis direction). The touch electrode YE01 is connected to the adjacent touch sense electrode YE01 through a first touch bridge 1010. A strip-like touch sense line extended in the first direction (X-axis direction) is thus formed by the connected touch electrodes YE01. The touch electrode XE02 is connected to the adjacent touch sense electrode XE02 through a second touch bridge 1020. A strip-like touch sense line extended in the second direction (Y-axis direction) is thus formed by the connected touch electrodes XE02. There is an insulation material disposed between the first touch bridge 1010 and the second touch bridge 1020 to insulate the first touch electrodes and the second touch electrodes.

Figure 11:
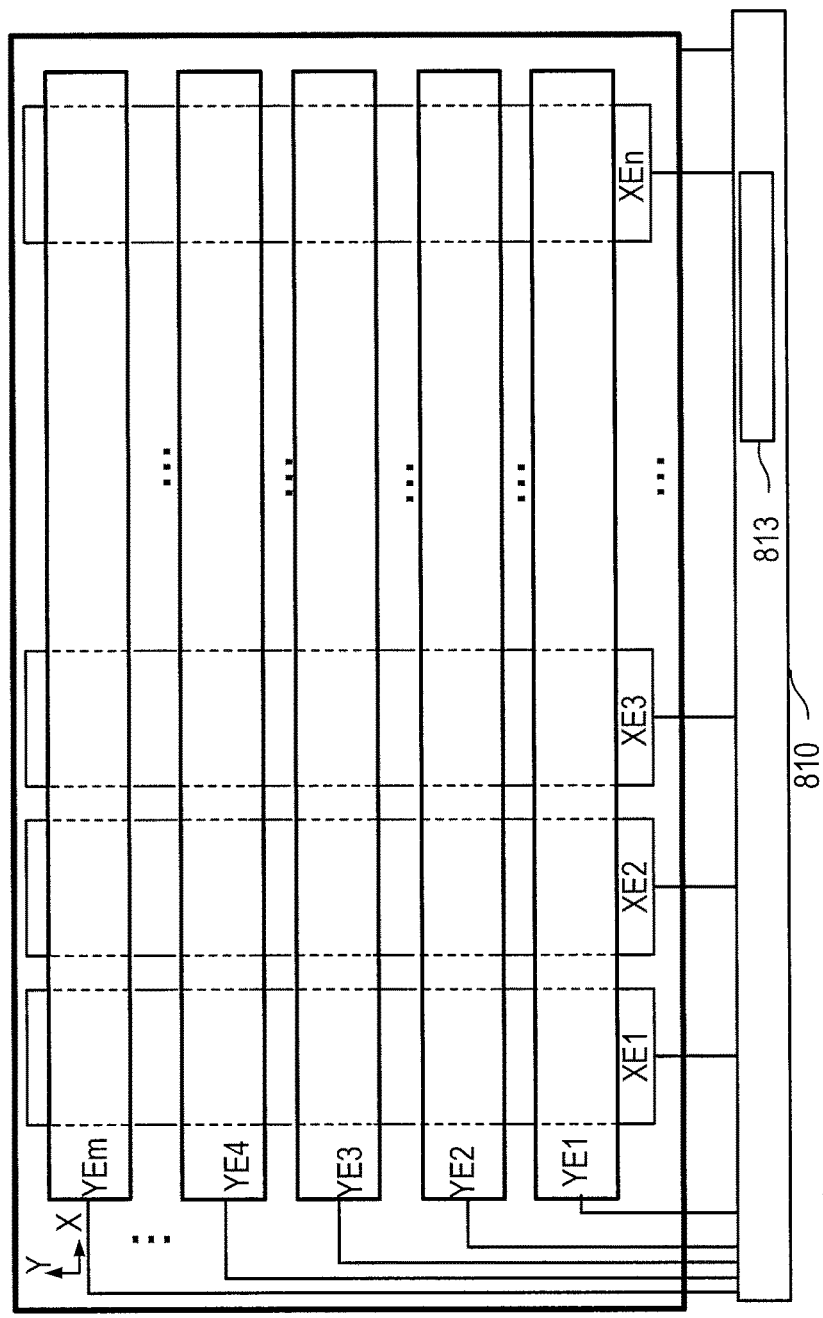
FIG. 11 is another schematic diagram of the touch electrode layer and the touch control circuit in accordance with the present disclosure.

FIG. 11 is another schematic diagram of the touch electrode layer and the touch control circuit in accordance with the present disclosure. The touch electrode layer 511 includes the first touch electrode layer 5111 and the second touch electrode layer 5113 (as shown in FIG. 6A, FIG. 6B or FIG. 6C). The first touch electrode layer 5111 includes a plurality of first touch electrodes XE1, XE2, . . . , XEn, each having a strip line shape, arranged along the first direction (X-axis direction). The second touch electrode layer 5113 includes a plurality of second touch electrodes YE1, YE2, . . . , YEm, each having a strip line shape, arranged along the second direction (Y-axis direction). Each of the first touch electrodes XE1, XE2, . . . , XEn and the second touch electrodes YE1, YE2, . . . , YEm is a transparent conductive electrode.

FIG. 12A is still another schematic diagram of the touch electrode layer and the touch control circuit in accordance with the present disclosure. FIG. 12B is a schematic diagram illustrating the relation of the black matrix layer, the touch electrode layer, and the data lines and gate lines. As shown in FIG. 12A and FIG. 12B, the touch electrode layer 511 includes the first touch electrode layer 5111 and the second touch electrode layer 5113. The first touch electrode layer 5111 includes a plurality of first touch electrodes XE1, XE2, . . . , XEn, each being a metal mesh electrode, preferably a black metal mesh electrode, arranged along the first direction (X-axis direction). The second touch electrode layer 5113 includes a plurality of second touch electrodes YE1, YE2, . . . , YEm, each being a metal mesh electrode, preferably a black metal mesh electrode, arranged along the second direction (Y-axis direction). Each of the first touch electrodes XE1, XE2, . . . , XEn and the second touch electrodes YE1, YE2, . . . , YEm is a metal mesh electrode formed by mesh lines 1201, and the mesh lines 1201 of the metal mesh electrodes are disposed at locations corresponding to opaque lines 1203 of the color filter and black matrix layer 513.

Figure 13:
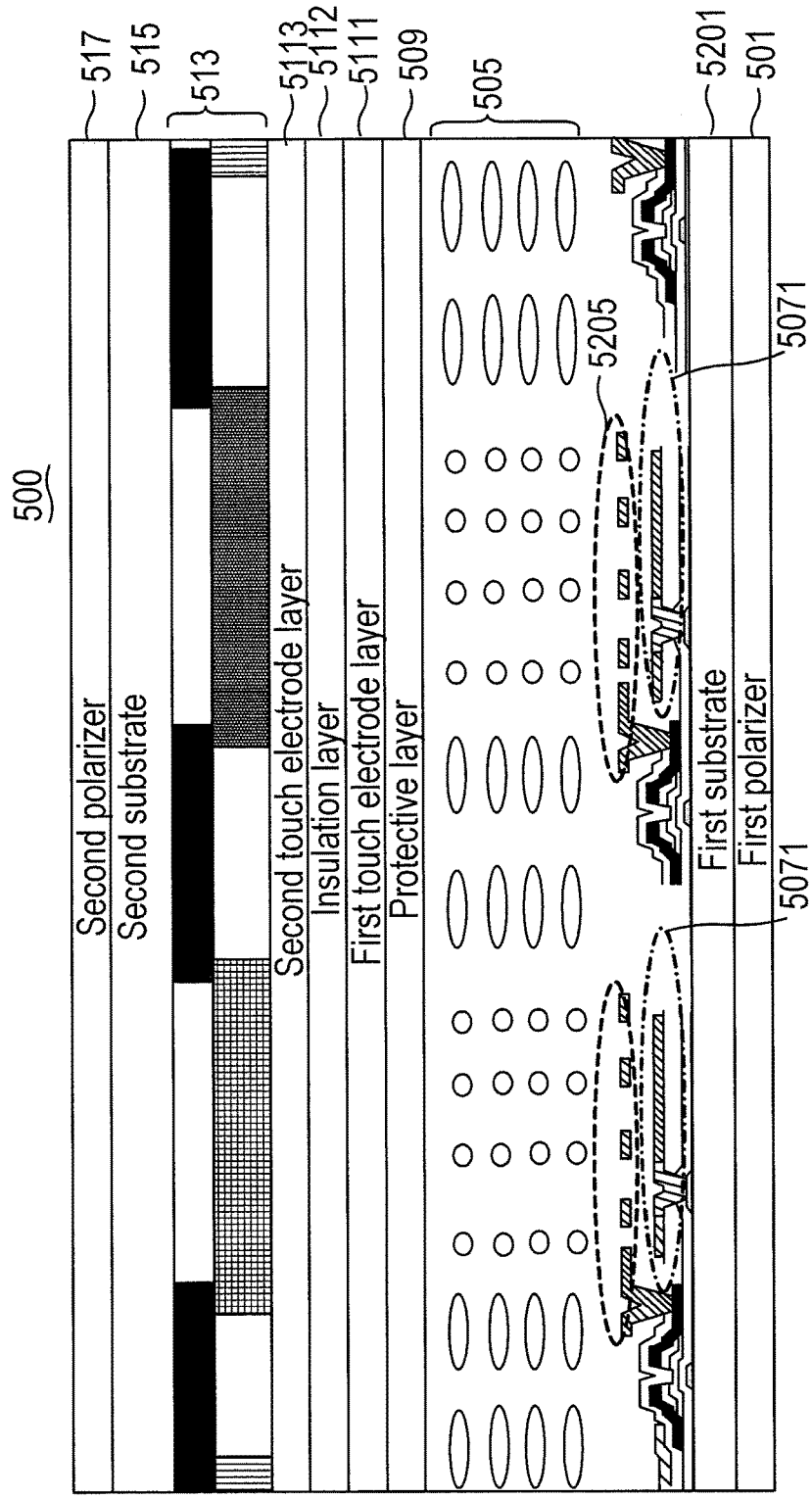
FIG. 13 is a schematic cross-section diagram of the display device with high touch detection sensitivity, as shown by FIG. 6C, in accordance with the present disclosure.

FIG. 13 is a schematic cross-section diagram of the display device with high touch detection sensitivity, as shown by FIG. 6C, in accordance with the present disclosure. As shown, the display device 500 in FIG. 13 is a fringe-field-switching liquid crystal panel, the common electrode layer 507 is disposed beneath the pixel electrode layer. Each of the touch electrodes of the first touch electrode layer 5111 and the second touch electrode layer 5113 can be a transparent electrode as shown in FIG. 10 and FIG. 11 or a metal mesh electrode as shown in FIG. 12A and FIG. 12B.

Figure 14:
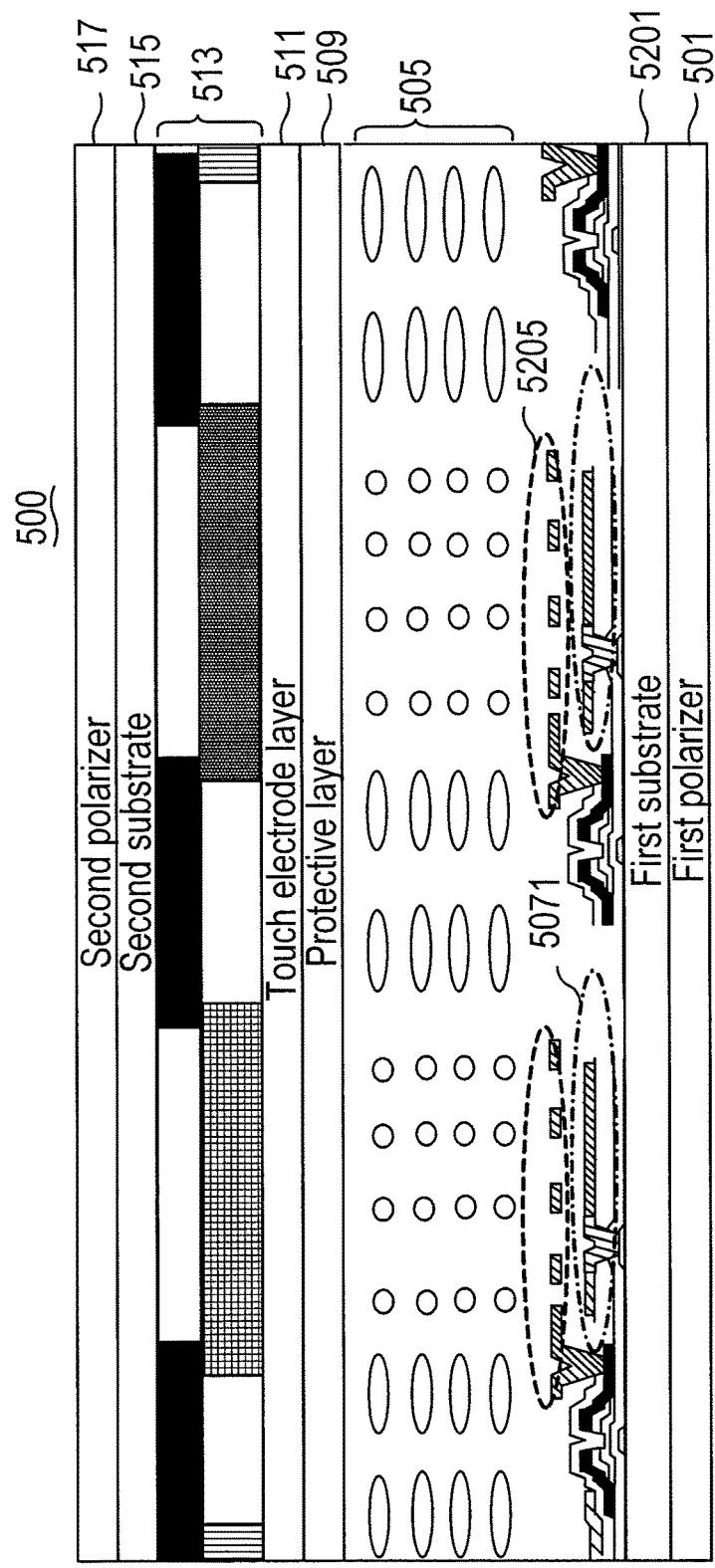
FIG. 14 is another schematic cross-section diagram of the display device with high touch detection sensitivity, as shown by FIG. 5C, in accordance with the present disclosure.

FIG. 14 is another schematic cross-section diagram of the display device with high touch detection sensitivity, as shown by FIG. 5C, in accordance with the present disclosure. As shown, the display device 500 in FIG. 14 is a fringe-field-switching liquid crystal panel, the common electrode layer 507 is disposed beneath the pixel electrode layer. The touch electrode layer 511 is a single electrode layer and each of the touch electrodes of the touch electrode layer 511 can be a transparent electrode as shown in FIG. 10 and FIG. 11 or a metal mesh electrode as shown in FIG. 12A and FIG. 12B.

Figure 15A:
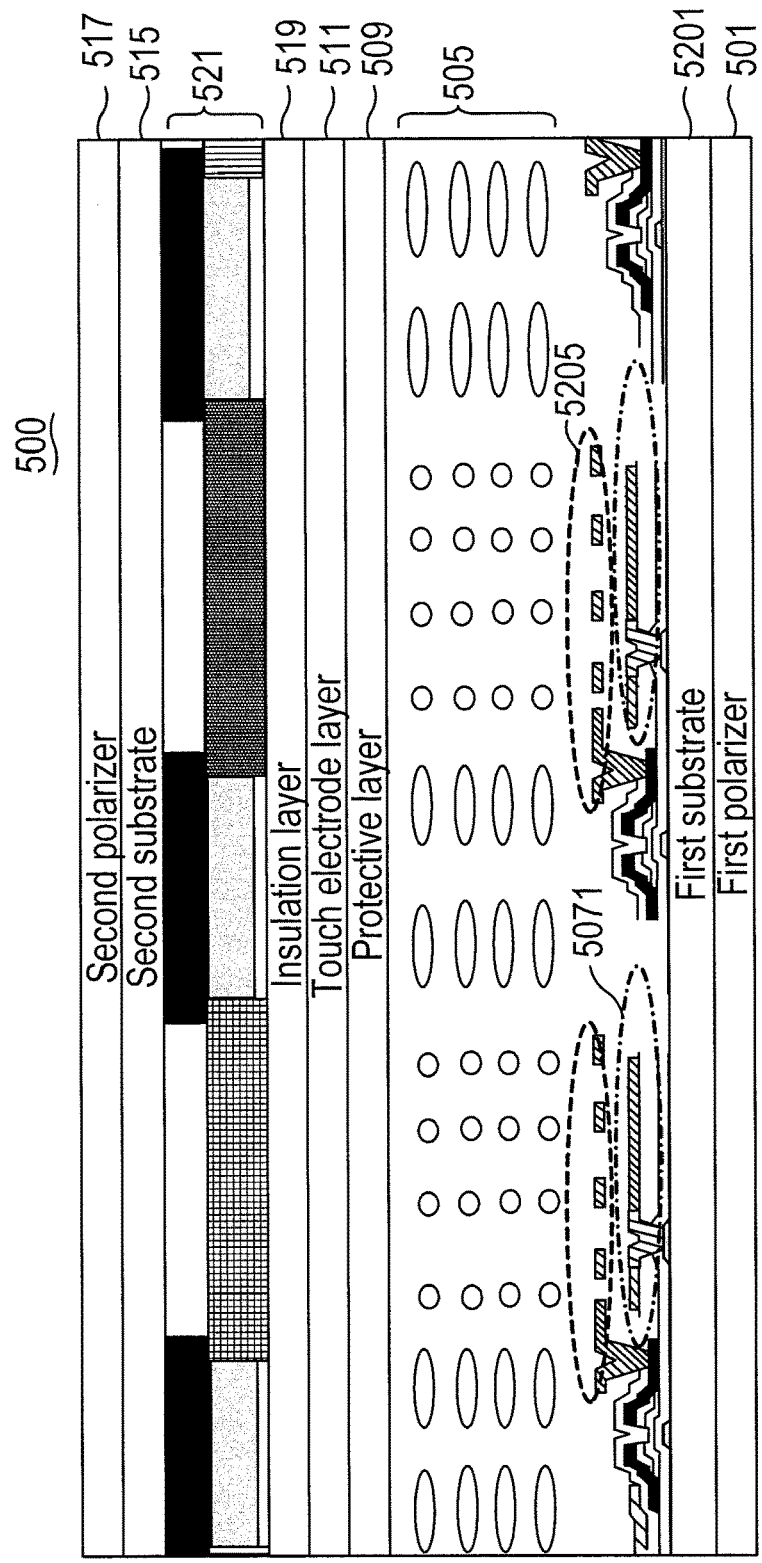
FIG. 15A is still another schematic cross-section diagram of the display device with high touch detection sensitivity, as shown by FIG. 7C, in accordance with the present disclosure.
Figure 15B:
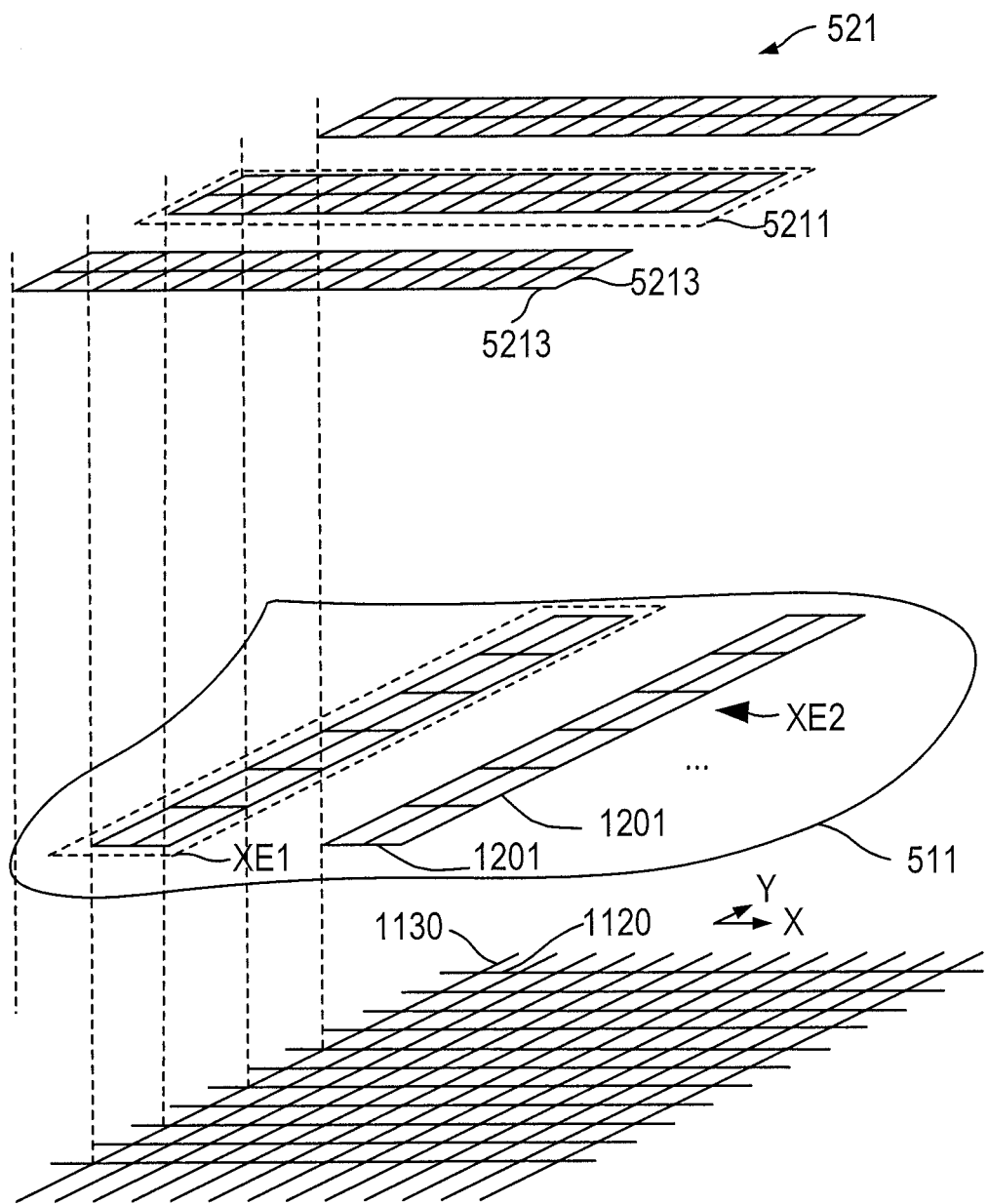
FIG. 15B is a schematic diagram illustrating the relation of the black matrix layer, the touch electrode layer, and the data lines and gate lines of the display device shown in FIG. 15A.

FIG. 15A is still another schematic cross-section diagram of the display device with high touch detection sensitivity, as shown by FIG. 7C, in accordance with the present disclosure. FIG. 15B is a schematic diagram illustrating the relation of the black matrix layer, the touch electrode layer, and the data lines and gate lines. As shown FIG. 15A and FIG. 15B, the common electrode layer 507 is disposed beneath the pixel electrode layer.

The color filter and black metal mesh electrode layer 521 includes a plurality of black metal mesh electrodes 5211. Each of the black metal mesh electrodes 5211 is formed by black metal mesh lines 5213. The black metal mesh electrodes 5211 are used to form a second touch electrode layer to perform the touch detection with the touch electrode layer 511. The touch electrode layer 511 is a single electrode layer and each of the touch electrodes of the touch electrode layer 511 can be a transparent electrode as shown in FIG. 10 and FIG. 11 or a metal mesh electrode as shown in FIG. 12A and FIG. 12B.

Figure 16:
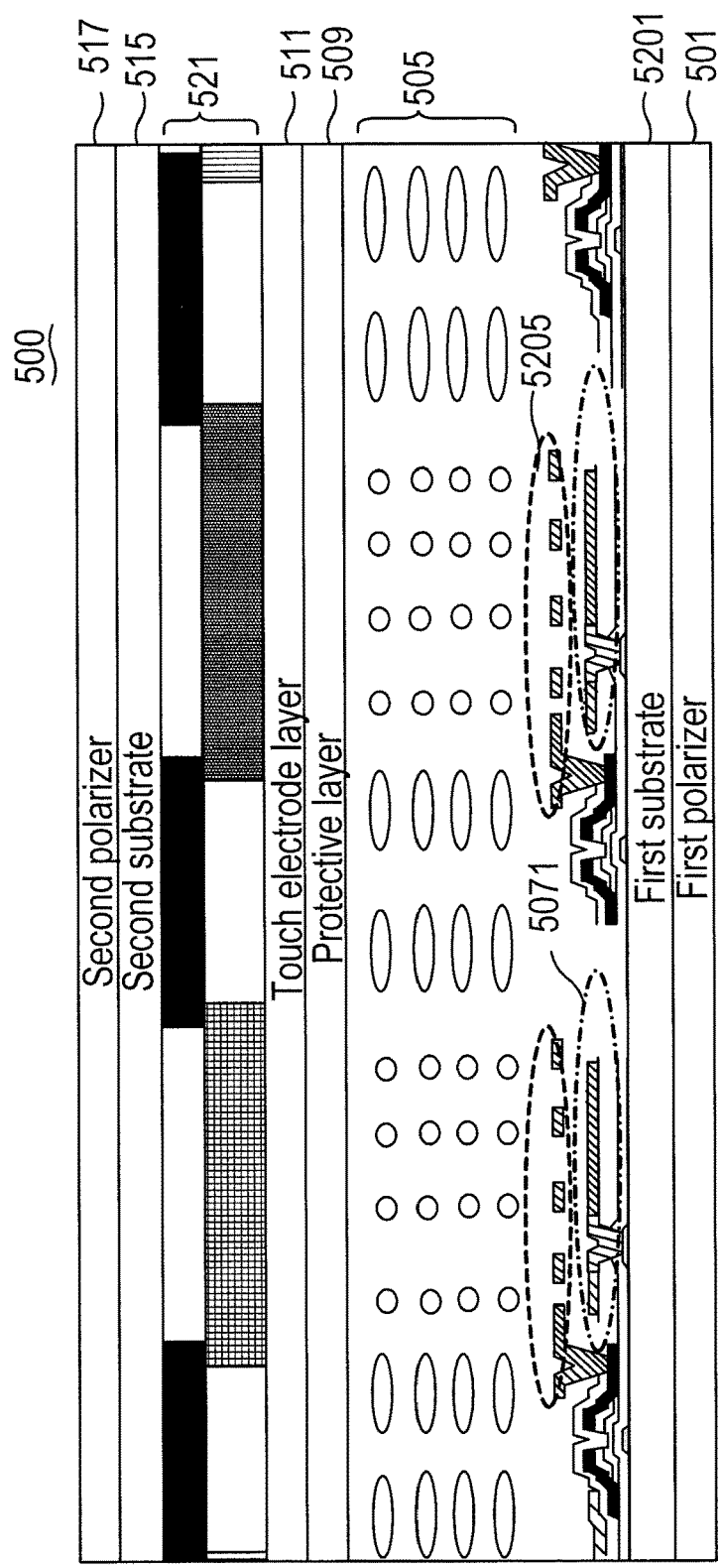
FIG. 16 is yet another schematic cross-section diagram of the display device with high touch detection sensitivity in accordance with the present disclosure.

FIG. 16 is yet another schematic cross-section diagram of the display device with high touch detection sensitivity in accordance with the present disclosure. As shown, the color filter and black metal mesh electrode layer 521 includes a plurality of black metal mesh electrodes 5211. Each of the black metal mesh electrodes 5211 is formed by black metal mesh lines 5213. The black metal mesh electrodes 5211 are used to form a second touch electrode layer to perform the touch detection with the touch electrode layer 511. The touch electrode layer Sills a single electrode layer and each of the touch electrodes of the touch electrode layer 511 can be a transparent electrode as shown in FIG. 10 and FIG. 11 or a metal mesh electrode as shown in FIG. 12A and FIG. 12B.

Figure 17:
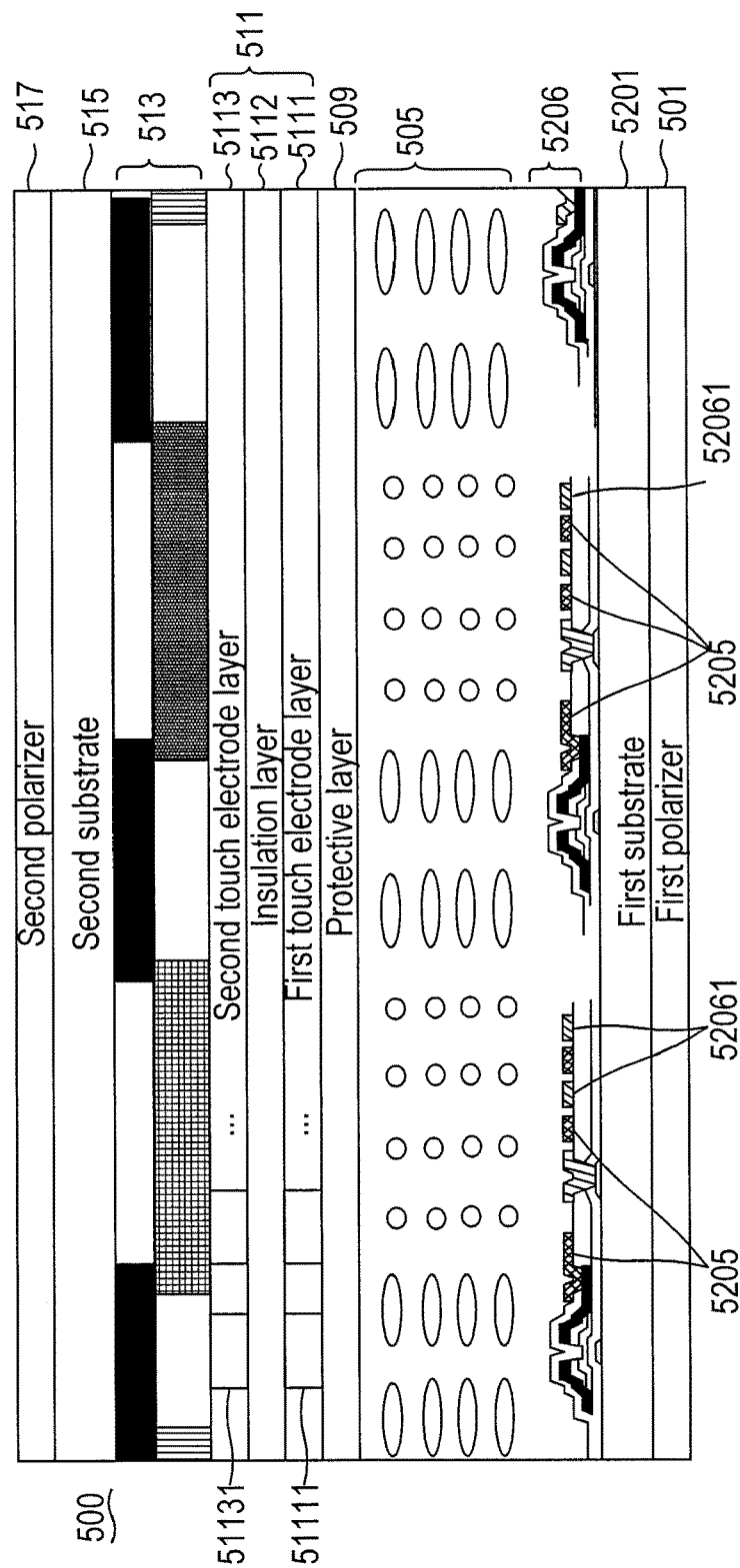
FIG. 17 is further another schematic cross-section diagram of the display device with high touch detection sensitivity in accordance with the present disclosure.

FIG. 17 is further another schematic cross-section diagram of the display device with high touch detection sensitivity, as shown by FIG. 6B, in accordance with the present disclosure. Instead of having two separated layers, the common electrode layer is disposed in the pixel electrode layer to form a pixel and common electrode layer 5206. As shown, the display device 500 in FIG. 17 is an in-plane-switching liquid crystal panel, and the pixel electrodes 5205 and the common electrodes 52061 are on the same plane. The touch electrode layer 511 includes a first touch electrode layer 5111, an insulation layer 5112 and a second touch electrode layer 5113. Each of the touch electrodes 51111, 51131 of the first touch electrode layer 5111 and the second touch electrode layer 5113 can be a transparent electrode as shown in FIG. 10 and FIG. 11 or a metal mesh electrode as shown in FIG. 12A and FIG. 12B.

Figure 18:
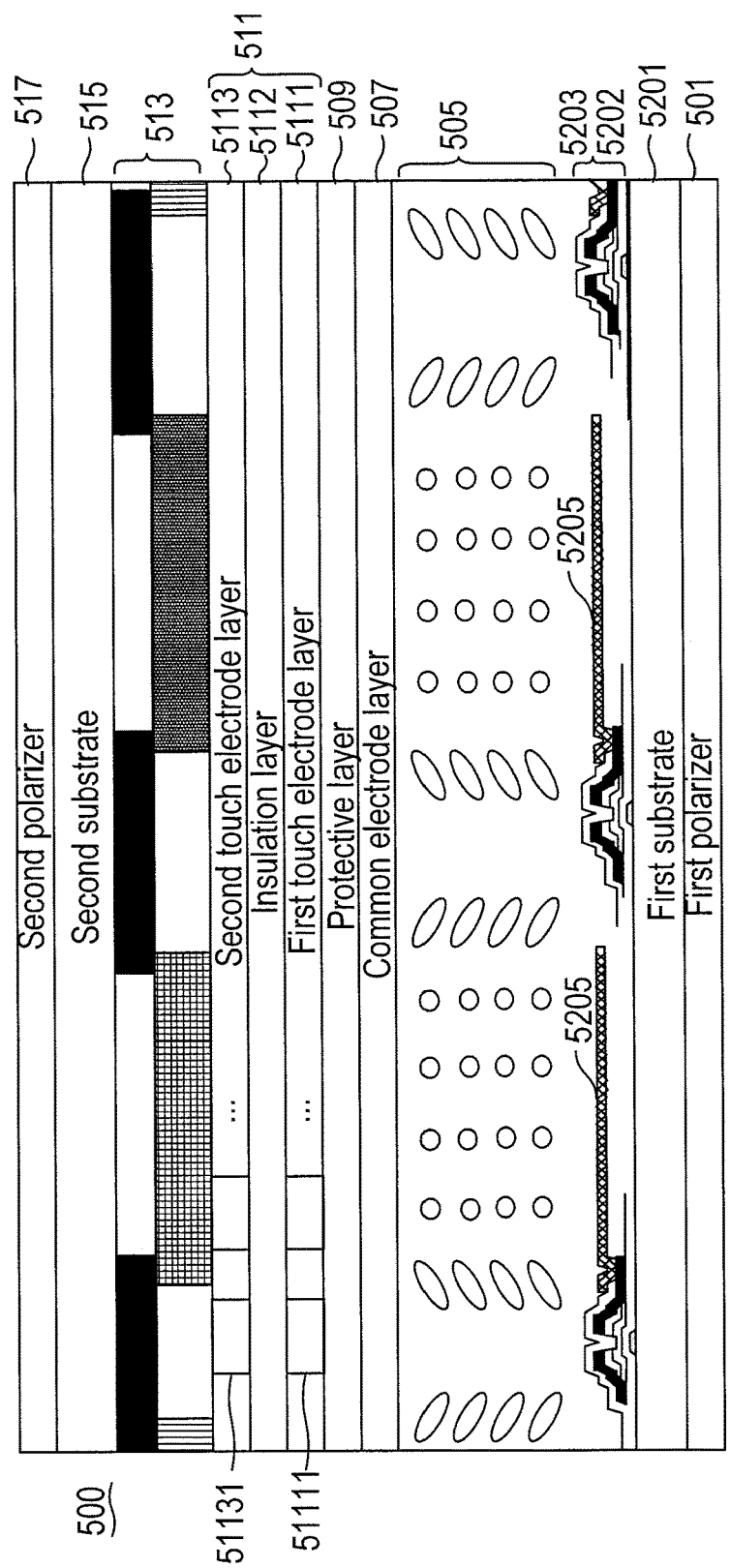
FIG. 18 is still further another schematic cross-section diagram of the display device with high touch detection sensitivity in accordance with the present disclosure.

FIG. 18 is still further another schematic cross-section diagram of the display device with high touch detection sensitivity in accordance with the present disclosure. As shown, the display device 500 in FIG. 18 is a twisted nematic (TN) liquid crystal panel or vertical alignment (VA) liquid crystal panel. The touch electrode layer 511 includes a first touch electrode layer 5111, an insulation layer 5112 and a second touch electrode layer 5113. Each of the touch electrodes 51111, 51131 of the first touch electrode layer 5111 and the second touch electrode layer 5113 can be a transparent electrode as shown in FIG. 10 and FIG. 11 or a metal mesh electrode as shown in FIG. 12A and FIG. 12B.

Figure 19:
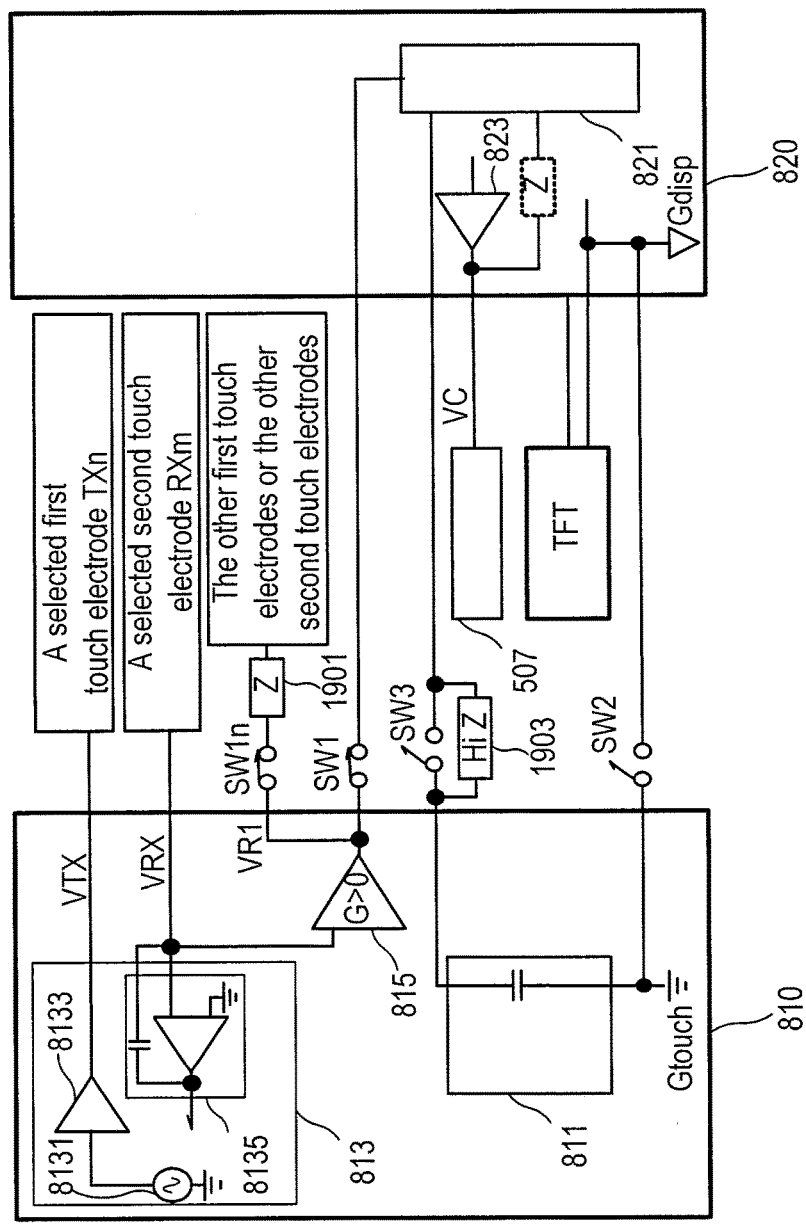
FIG. 19 is a schematic diagram illustrating the operation of the touch control circuit in accordance with the present disclosure.

FIG. 19 is a schematic diagram illustrating the operation of the touch control circuit in accordance with the present disclosure. The mutual-capacitance circuit 813 includes a touch stimulation signal generator 8131, a driver 8133, and an amplifier 8135. The touch stimulation signal generator 8131 sequentially or randomly generates the touch stimulation signal VTX. The driver 8133 couples the touch stimulation signal VTX to a selected first touch electrode TXn in the touch electrode layer 511. The amplifier 8135 receives a touch sense signal VRX from a selected second touch electrode RXm of the touch electrode layer 511. The touch sense signal VRX is driven by the in-phase amplifier 815 to generate a signal VR1, wherein the signal VR1 is in phase with the touch sense signal VRX. The in-phase amplifier 815 couples the signal VR1 to the other non-selected first touch electrodes or the other non-selected second touch electrodes through a switch SW1n and a passive component 1901.

As shown in FIG. 19, there are three switches SW1, SW2 and SW3 arranged between the display control circuit 820 and the touch control circuit 810.

When the switch SW1 is in an ON state, the signal VR1 can be coupled to the power output node 825 of the display control circuit 820 which is shown in FIG. 9. In the touch detection operation, the switches SW2 and SW3 are in an OFF state, and there is no current loop between the display control circuit 820 and the touch control circuit 810 or there is a high impedance of a passive component 1903 between the display control circuit 820 and the touch control circuit 810, where the high impedance is not less than 100 KΩ (Ohm).

Figure 20:
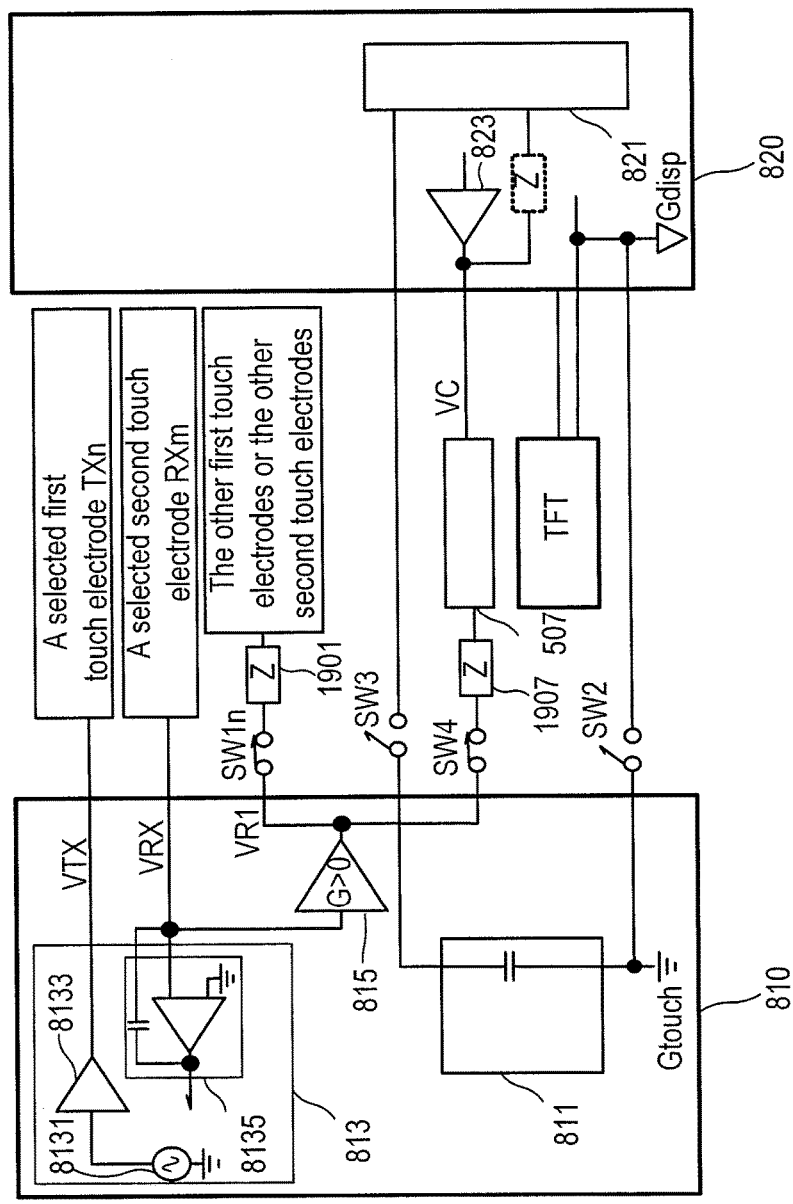
FIG. 20 is another schematic diagram illustrating the operation of the touch control circuit in accordance with the present disclosure.

FIG. 20 is another schematic diagram illustrating the operation of the touch control circuit 810 in accordance with the present disclosure. As shown, there is a switch SW4 and a passive component 1907 arranged between the display control circuit 820 and the common electrode layer 507. The in-phase amplifier 815 couples the signal VR1 to the common electrode layer 507 through the switch SW4 and a passive component 1907.

Figure 21:
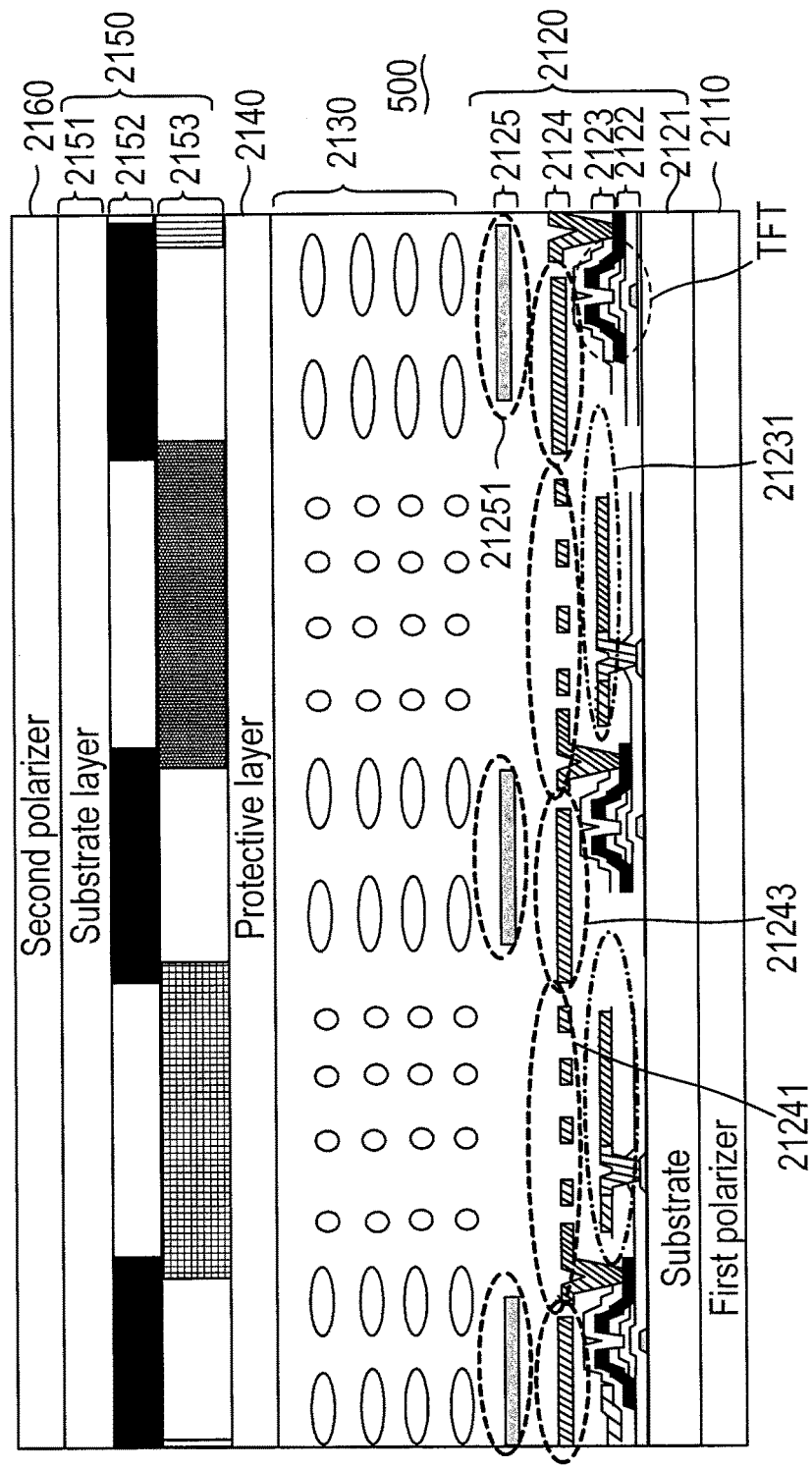
FIG. 21 is a yet further schematic cross-section diagram of the display device with high touch detection sensitivity in accordance with the present disclosure.

FIG. 21 is yet further schematic cross-section diagram of the display device with high touch detection sensitivity in accordance with the present disclosure. As shown, the display device 500 includes a first polarizer 2110, a thin film transistor (TFT) substrate layer 2120, a display material layer 2130, a protective layer 2140, a color filter substrate layer 2150, and a second polarizer 2160.

The TFT substrate layer 2120 is disposed on one side of the first polarizer 2110. The TFT substrate layer 2120 includes a substrate 2121, a TFT layer 2122, a common electrode layer 2123, a display electrode and first touch electrode layer 2124, and a second electrode layer 2125.

The substrate 2121 is disposed on one side of the first polarizer 2110. The TFT layer 2122 is disposed on one side of the substrate 2121, and includes a plurality of display TFTs, a plurality of gate lines and data lines (as shown in FIG. 12B with numerals 1120 and 1130).

The common electrode layer 2123 is disposed on one side of the TFT layer 2122 opposite to the substrate 2121, and includes a common electrode 21231.

The display electrode and first touch electrode layer 2124 is disposed on one side of the common electrode layer 2123 opposite to the substrate 2121, and includes a plurality of pixel electrodes 21241 and a plurality of first transparent mesh electrodes 21243 arranged along a first direction (X-axis direction).

The second electrode layer 2125 is disposed on one side of the display electrode and first touch electrode layer 2124 opposite to the common electrode layer 2123, and includes a plurality of second touch electrodes 21251 arranged along a second direction. Each of the second touch electrodes 21251 is a transparent mesh conductive electrode, or each of the second touch electrodes 21251 is a metal mesh electrode formed by mesh lines 1201, and the mesh lines 1201 of the metal mesh electrodes 21251 are disposed at locations corresponding to opaque lines 1203 of a black matrix layer 2152 (as shown in FIG. 12A and FIG. 12B).

The display material layer 2130 is disposed on one side of the TFT substrate layer 2120 opposite to the first polarizer 2110. The protective layer 2140 is disposed on one side of the display material layer 2130 opposite to the first polarizer 2110.

The color filter substrate layer 2150 is disposed on one side of the protective layer 2140 opposite to the first polarizer 2110, and includes a substrate layer 2151, a black matrix layer 2152, and a color filter layer 2153. The color filter layer 2153 is disposed on one side of the protective layer 2140 opposite to the first polarizer 2110. The black matrix layer 2152 is disposed on one side of the color filter layer 2153 opposite to the first polarizer 2110. The substrate layer 2151 is disposed on one side of the black matrix layer 2152 opposite to the first polarizer 2110. The second polarizer 2160 is disposed on one side of the substrate layer 2151 opposite to the first polarizer 2110.

The display device 500 shown in FIG. 21 is similar to those of previous embodiments, and thus the display device 500 of this embodiment can be described by referencing to FIG. 8A, FIG. 9, FIG. 19 and FIG. 21. That is, with reference to FIG. 8A, the display device 500 further includes a display control circuit 820 and a touch control circuit 810.

The display control circuit 820 includes a display power 821 and a display drive circuit 823.

The touch control circuit 810 includes a touch power 811, a mutual-capacitance sense circuit 813, and an in-phase amplifier 815. The touch control circuit 810 sequentially or randomly couples a touch stimulation signal VTX to a selected first transparent mesh electrode TXn and receives a touch sense signal VRX from a selected second touch electrode RXm. The touch sense signal VRX is driven by the in-phase amplifier 815 and coupled to the common electrode layer 2123 or a node of the display control circuit 820 for performing a touch detection operation. The in-phase amplifier 815 has a gain greater than 0.

In a touch detection operation, there is no current loop between the display control circuit 820 and the touch control circuit 810, or there is a high impedance between the display control circuit 820 and the touch control circuit 810 and the high impedance is not less than 100 KΩ (Ohm). The touch control circuit 810 couples a signal VR1 to the other non-selected first transparent mesh electrodes or the other non-selected second touch electrodes, and the signal VR1 is in phase with the touch sense signal VRX.

The display control circuit 820 sequentially outputs a scan signal to a gate line, outputs data signals to the corresponding data lines, and outputs a common voltage signal VC to the common electrode layer 2123 for performing a display operation.

Then, with reference to FIG. 9, the node of the display control circuit 820 is a power output node 825 of the display control circuit 820, a ground node 827 of the display control circuit 820, or a drive output node 829 of the display control circuit 820.

Further, with reference to FIG. 19, there are three switches SW1, SW2 and SW3 arranged between the display control circuit 820 and the touch control circuit 810. When the switch SW1 is in an ON state, the signal VR1 can be coupled to the power output node 825, shown in FIG. 9, of the display control circuit 820. In the touch detection operation, the switches SW2 and SW3 are in an OFF state, and there is no current loop between the display control circuit 820 and the touch control circuit 810 or there is a high impedance of a passive component 1903 between the display control circuit 820 and the touch control circuit 810, where the high impedance is not less than 100 KΩ (Ohm).

Figure 1:
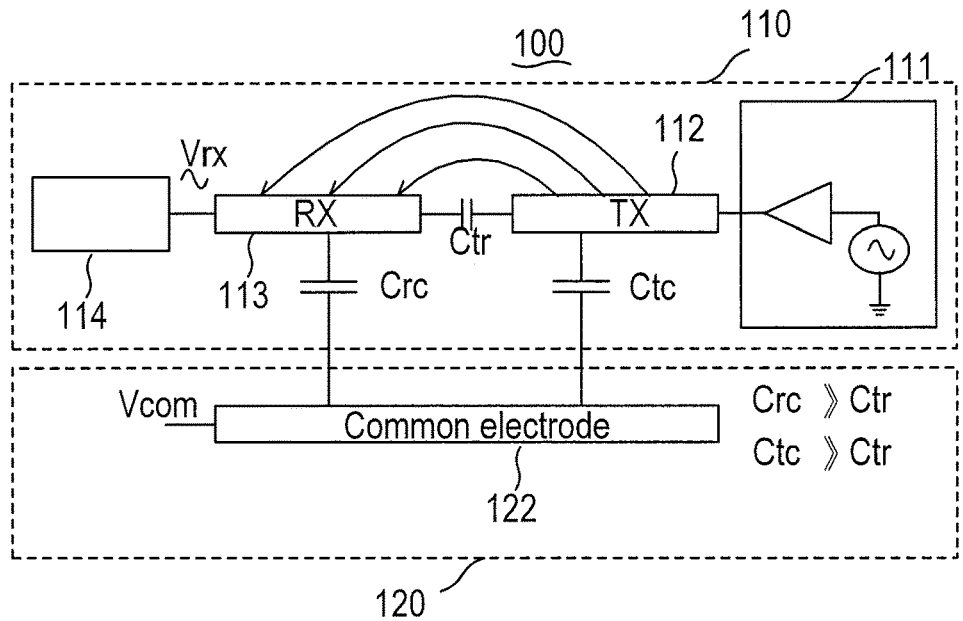
FIG. 1 is a schematic diagram of a touch display panel.
Figure 2:
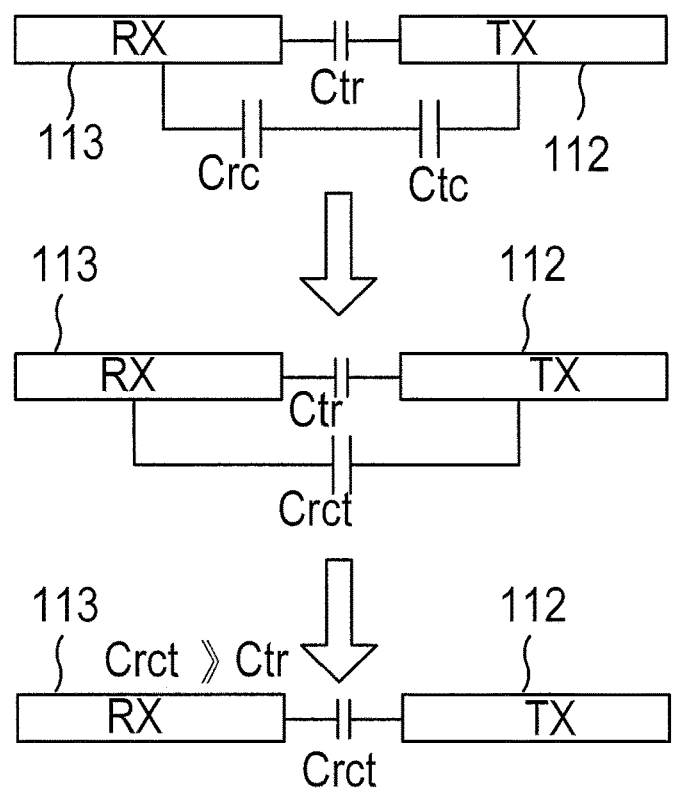
FIG. 2 is a schematic diagram illustrating the equivalent capacitance of FIG. 1.
Figure 3:
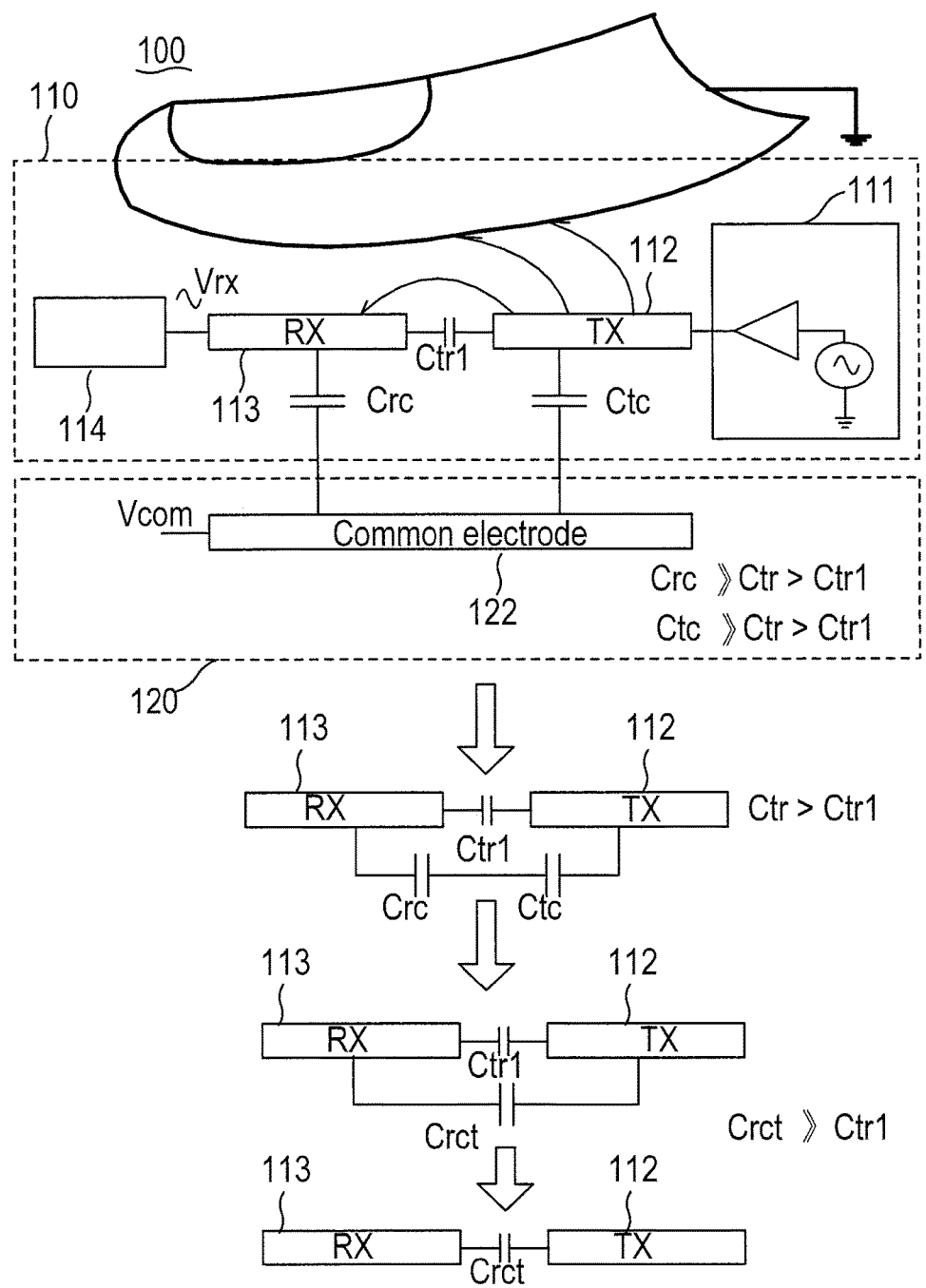
FIG. 3 is a schematic diagram illustrating a finger touching the touch display panel of FIG. 1.

In view of the foregoing, it is known that the prior design shown in FIG. 3 shall increase parasitic capacitance of the touch panel and thus is not suitable for the trend of touch detection. In the present disclosure, owing to the background parasitic capacitance being removed, the display device 500 in accordance with the present disclosure can perform the touch detection with high touch detection sensitivity.

Although the present invention has been explained in relation to its preferred embodiment, it is to be understood that many other possible modifications and variations can be made without departing from the spirit and scope of the invention as hereinafter claimed.

What is claimed is:

1. A display device with high touch detection sensitivity, comprising:
    a thin film transistor (TFT) substrate layer including a first substrate having a surface formed thereon a plurality of display TFTs, a plurality of gate lines and data lines, and a pixel electrode layer having a plurality of display pixel electrodes;
    a display material layer disposed on one side of the TFT substrate;
    a common electrode layer disposed on one side of the first substrate;
    a touch electrode layer disposed on one side of the display material layer opposite to the TFT substrate, and including:
        a plurality of first touch electrodes arranged along a first direction; and
        a plurality of second touch electrodes arranged along a second direction;
    a display control circuit including a display power and a display drive circuit; and
    a touch control circuit including a touch power and a mutual-capacitance sense circuit, the touch control circuit sequentially or randomly coupling a touch stimulation signal to a selected first touch electrode and receiving a touch sense signal from a selected second touch electrode, the touch sense signal being driven by an in-phase amplifier and coupled to the common electrode layer or a node of the display control circuit for performing a touch detection operation,
    wherein, in the touch detection operation, there is no current loop between the display control circuit and the touch control circuit, or there is a high impedance between the display control circuit and the touch control circuit and the high impedance is not less than 100 KΩ (Ohm).

2. The display device with high touch detection sensitivity as claimed in claim 1, wherein the common electrode layer is disposed on one side of the display material layer opposite to the TFT layer, in the pixel electrode layer, or between the display material layer and the first substrate.

3. The display device with high touch detection sensitivity as claimed in claim 1, wherein the display control circuit sequentially outputs a scan signal to a gate line, outputs data signals to the corresponding data lines, and outputs a common voltage signal to the common electrode layer for performing a display operation.

4. The display device with high touch detection sensitivity as claimed in claim 1, wherein the in-phase amplifier has a gain greater than 0.

5. The display device with high touch detection sensitivity as claimed in claim 1, wherein the touch control circuit couples a signal to the other non-selected first touch electrodes or the other non-selected second touch electrodes, and the signal is in-phase with the touch sense signal.

6. The display device with high touch detection sensitivity as claimed in claim 1, wherein the node of the display control circuit is a power output node of the display control circuit, a ground node of the display control circuit, or a drive output node of the display control circuit.

7. The display device with high touch detection sensitivity as claimed in claim 1, further comprising:
    a switch device arranged between the touch control circuit and the common electrode layer.

8. The display device with high touch detection sensitivity as claimed in claim 1, further comprising:
    at least one switch device arranged between the touch control circuit and the display control circuit.

9. The display device with high touch detection sensitivity as claimed in claim 1, wherein each of the first touch electrodes or each of the second touch electrodes is a transparent conductive electrode.

10. The display device with high touch detection sensitivity as claimed in claim 1, wherein the plurality of first touch electrodes or the plurality of second touch electrodes are each a black metal mesh electrode.

11. The display device with high touch detection sensitivity as claimed in claim 1, further comprising:
    a color filter and black matrix layer disposed on one side of the display material layer opposite to the TFT substrate layer.

12. The display device with high touch detection sensitivity as claimed in claim 11, wherein each of the touch electrodes is a metal mesh electrode formed by mesh lines, and the mesh lines of the metal mesh electrodes are disposed at locations corresponding to opaque lines of the black matrix layer.

13. The display device with high touch detection sensitivity as claimed in claim 1, further comprising:
    an insulation layer disposed between the plurality of first touch electrodes and the plurality of second touch electrodes.

14. A display device with high touch detection sensitivity, comprising:
- a thin film transistor (TFT) substrate layer, including
  - a substrate;
  - a TFT layer disposed on one side of the substrate, and including a plurality of display TFTs, a plurality of gate lines, and a plurality of data lines;
  - a common electrode layer disposed on one side of the TFT layer opposite to the substrate, and including a common electrode;
  - a display electrode and first touch electrode layer disposed on one side of the common electrode layer opposite to the substrate, and including a plurality of display pixel electrodes and a plurality of first transparent mesh electrodes arranged along a first direction; and
  - a second electrode layer disposed on one side of the display electrode and first touch electrode layer opposite to the common electrode layer, and including a plurality of second touch electrodes arranged along a second direction;
- a color filter substrate layer including a substrate layer, a black matrix layer, and a color filter layer;
- a display material layer disposed between the TFT substrate layer and the color filter substrate layer;
- a display control circuit including a display power and a display drive circuit; and
- a touch control circuit including a touch power and a mutual-capacitance sense circuit, the touch control circuit sequentially or randomly coupling a touch stimulation signal to a selected first transparent mesh electrode and receiving a touch sense signal from a selected second touch electrode, the touch sense signal being driven by an in-phase amplifier and coupled to the common electrode layer or a node of the display control circuit for performing a touch detection operation,
- wherein, in the touch detection operation, there is no current loop between the display control circuit and the touch control circuit, or there is a high impedance between the display control circuit and the touch control circuit and the high impedance is not less than 100 KΩ (Ohm).

15. The display device with high touch detection sensitivity as claimed in claim 14, wherein the display control circuit sequentially outputs a scan signal to a gate line, outputs data signals to the corresponding data lines, and outputs a common voltage signal to the common electrode layer for performing a display operation.

16. The display device with high touch detection sensitivity as claimed in claim 14, wherein the in-phase amplifier has a gain greater than 0.

17. The display device with high touch detection sensitivity as claimed in claim 14, wherein the touch control circuit couples a signal to the other non-selected first transparent mesh electrodes or the other non-selected second touch electrodes, and the signal is in-phase with the touch sense signal.

18. The display device with high touch detection sensitivity as claimed in claim 14, wherein the node of the display control circuit is a power output node of the display control circuit, a ground node of the display control circuit, or a drive output node of the display control circuit.

19. The display device with high touch detection sensitivity as claimed in claim 14, further comprising:
- a switch device arranged between the touch control circuit and the common electrode layer.

20. The display device with high touch detection sensitivity as claimed in claim 14, further comprising:
- a switch device arranged between the touch control circuit and the display control circuit.

21. The display device with high touch detection sensitivity as claimed in claim 14, wherein each of the second touch electrodes is a transparent mesh conductive electrode.

22. The display device with high touch detection sensitivity as claimed in claim 14, wherein each of the second touch electrodes is a metal mesh electrode formed by mesh lines, and the mesh lines of the metal mesh electrodes are disposed at locations corresponding to opaque lines of the black matrix layer.

* * * * *